United States Patent
Ichimaru et al.

(10) Patent No.: US 11,201,997 B2
(45) Date of Patent: Dec. 14, 2021

(54) SOLID-STATE IMAGING DEVICE, DRIVING METHOD, AND ELECTRONIC APPARATUS

(71) Applicant: SONY SEMICONDUCTOR SOLUTIONS CORPORATION, Kanagawa (JP)

(72) Inventors: Norihiro Ichimaru, Kanagawa (JP); Masao Zen, Chiba (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/612,490

(22) PCT Filed: Apr. 27, 2018

(86) PCT No.: PCT/JP2018/017155
§ 371 (c)(1),
(2) Date: Nov. 11, 2019

(87) PCT Pub. No.: WO2018/207665
PCT Pub. Date: Nov. 15, 2018

(65) Prior Publication Data
US 2020/0099852 A1 Mar. 26, 2020

(30) Foreign Application Priority Data
May 11, 2017 (JP) .............................. JP2017-095080

(51) Int. Cl.
*H04N 5/232* (2006.01)
*H04N 5/217* (2011.01)
(Continued)

(52) U.S. Cl.
CPC ....... *H04N 5/23212* (2013.01); *H04N 5/2173* (2013.01); *H04N 5/37455* (2013.01); *G03B 13/36* (2013.01)

(58) Field of Classification Search
CPC ... H04N 5/2173; H04N 5/37455; G03B 13/36
See application file for complete search history.

(56) References Cited

U.S. PATENT DOCUMENTS 9,325,919 B2 * 4/2016 Uchida ................. H04N 5/378
2015/0163403 A1 * 6/2015 Wakabayashi ....... H04N 5/3698
348/308

FOREIGN PATENT DOCUMENTS

JP 2011-114786 A 6/2011
JP 2015-185927 A 10/2015
(Continued)

OTHER PUBLICATIONS

International Search Report and Written Opinion of PCT Application No. PCT/JP2018/017155, dated Jul. 17, 2018, 07 pages of English Translation and 08 pages of ISRWO.

*Primary Examiner* — Twyler L Haskins
*Assistant Examiner* — Fayez A Bhuiyan
(74) *Attorney, Agent, or Firm* — Chip Law Group

(57) ABSTRACT

The present technology relates to a solid-state imaging device, a driving method, and an electronic apparatus that can suppress a decrease in signal reading speed of the solid-state imaging device. A solid-state imaging device according to a first aspect of the present technology includes a pixel array unit in which a plurality of pixels is arrayed, a signal processing unit configured to perform a signal process including at least A/D conversion on a noise signal and a data signal read from the pixel, and a memory unit configured to retain a signal obtained in the signal process, in which the signal processing unit records the noise signal obtained from a predetermined frame in the memory unit, and performs the signal process of the data signal obtained from a frame after the predetermined frame by using the noise signal recorded in the memory unit.

18 Claims, 17 Drawing Sheets

(51) Int. Cl.
*H04N 5/3745* (2011.01)
*G03B 13/36* (2021.01)

(56) References Cited

FOREIGN PATENT DOCUMENTS

| | | |
|---|---|---|
| JP | 2016-127413 A | 7/2016 |
| WO | 2015/141491 A1 | 9/2015 |

* cited by examiner

SOLID-STATE IMAGING DEVICE, DRIVING METHOD, AND ELECTRONIC APPARATUS

CROSS REFERENCE TO RELATED APPLICATIONS

This application is a U.S. National Phase of International Patent Application No. PCT/JP2018/017155 filed on Apr. 27, 2018, which claims priority benefit of Japanese Patent Application No. JP 2017-095080 filed in the Japan Patent Office on May 11, 2017. Each of the above-referenced applications is hereby incorporated herein by reference in its entirety.

TECHNICAL FIELD

The present technology relates to a solid-state imaging device, a driving method, and an electronic apparatus, and more particularly, relates to, for example, a solid-state imaging device, in which a plurality of photoelectric conversion units is formed in a region for one pixel, a driving method, and an electronic apparatus.

BACKGROUND ART

An (image plane) phase detection autofocus (AF) is known as an AF system for a digital camera or the like (see, for example, Patent Document 1).

In a pixel array unit of an image sensor that realizes phase detection AF, in addition to normal pixels for obtaining pixel signals of an image, phase difference detection pixels for performing pupil division on incident light are arranged at predetermined locations.

The phase difference detection pixel is used, for example, for phase detection AF, and the pixel signal at the location where the phase difference detection pixel is arranged is obtained by an interpolation process.

Therefore, a solid-state imaging device in which two photoelectric conversion units (photodiodes, or the like) are formed in the region for one pixel of the pixel array unit so that output of the phase difference detection pixel can be used not only for application of phase detection AF but also as a pixel signal constituting an image has been appeared. Since the solid-state imaging device has two photoelectric conversion units in a region for one pixel of the pixel array, the solid-state imaging device is hereinafter referred to as a double sensor.

In the double sensor, outputs of the two photoelectric conversion units formed in the region for one pixel can be individually used for phase detection AF. Furthermore, in the double sensor, outputs of the two photoelectric conversion units formed in the region for one pixel can be added together and used as a pixel signal of a pixel constituting an image.

CITATION LIST

Patent Document

Patent Document 1: Japanese Patent Application Laid-Open No. 2007-304188

SUMMARY OF THE INVENTION

Problems to be Solved by the Invention

It is noted that, in the case of the double sensor, in order to obtain a pixel signal for one pixel, Analog Digital (A/D) conversion needs to be performed for signals read from the two photoelectric conversion units formed in the region for one pixel. Therefore, the time required to obtain the A/D conversion result per pixel is longer than that of an image sensor (hereinafter referred to as a single sensor) in which one photoelectric conversion unit is formed in a region for one pixel. As a result, reading speed (fps) from the double sensor decreases.

The present technology has been made in view of such a situation, and enables suppression of a decrease in reading speed of a solid-state imaging device in which a plurality of photoelectric conversion units is formed in a region for one pixel.

Solution to Problems

A solid-state imaging device according to a first aspect of the present disclosure includes a pixel array unit in which a plurality of pixels is arrayed, a signal processing unit configured to perform a signal process including at least A/D conversion on a noise signal and a data signal read from the pixel, and a memory unit configured to retain a signal obtained in the signal process, in which the signal processing unit records the noise signal obtained from a predetermined frame in the memory unit, and performs the signal process of the data signal obtained from a frame after the predetermined frame by using the noise signal recorded in the memory unit.

A driving method according to the first aspect of the present disclosure being a driving method of a solid-state imaging device including a pixel array unit in which a plurality of pixels is arrayed, a signal processing unit configured to perform a signal process including at least A/D conversion on a noise signal and a data signal read from the pixel, and a memory unit configured to retain a signal obtained in the signal process, the method including a recording step of recording, by the signal processing unit, the noise signal obtained from a predetermined frame in the memory unit, and a signal processing step of performing, by the signal processing unit, the signal process of the data signal obtained from a frame after the predetermined frame by using the noise signal recorded in the memory unit.

An electronic apparatus according to the first aspect of the present disclosure being an electronic apparatus including a solid-state imaging device, in which the solid-state imaging device includes a pixel array unit in which a plurality of pixels is arrayed, a signal processing unit configured to perform a signal process including at least A/D conversion on a noise signal and a data signal read from the pixel, and a memory unit configured to retain a signal obtained in the signal process, and the signal processing unit records the noise signal obtained from a predetermined frame in the memory unit and performs the signal process of the data signal obtained from a frame after the predetermined frame by using the noise signal recorded in the memory unit.

According to the first aspect of the present disclosure, a noise signal obtained from a predetermined frame is recorded in the memory unit, and a signal process of a data signal obtained from a frame after the predetermined frame is performed by using the noise signal recorded in the memory unit.

A solid-state imaging device according to a second aspect of the present technology includes a first semiconductor substrate on which a plurality of pixels including a first pixel is arrayed, a second semiconductor substrate including an A/D conversion unit configured to perform A/D conversion on a read signal read from the first pixel, and a third semiconductor substrate including a memory unit, in which the first semiconductor substrate, the second semiconductor substrate, and the third semiconductor substrate are laminated in three layers such that the first semiconductor substrate is the uppermost layer, the read signal includes a first noise signal and a first data signal obtained in a first frame, and a second data signal obtained in a second frame, the memory unit records the first noise signal, and the A/D conversion unit performs first A/D conversion according to the first data signal and the first noise signal and performs second A/D conversion according to the second data signal and the first noise signal.

A driving method according to the second aspect of the present technology being a driving method of a solid-state imaging device including a first semiconductor substrate on which a plurality of pixels including a first pixel is arrayed, a second semiconductor substrate including an A/D conversion unit configured to perform A/D conversion on a read signal read from the first pixel, and a third semiconductor substrate including a memory unit, in which the first semiconductor substrate, the second semiconductor substrate, and the third semiconductor substrate are laminated in three layers such that the first semiconductor substrate is the uppermost layer, and the read signal includes a first noise signal and a first data signal obtained in a first frame, and a second data signal obtained in a second frame, the method including a recording step of recording, by the memory unit, the first noise signal, a first A/D conversion step of performing, by the A/D conversion unit, first A/D conversion according to the first data signal and the first noise signal, and a second A/D conversion step of performing, by the A/D conversion unit, second A/D conversion according to the second data signal and the first noise signal.

An electronic apparatus according to the second aspect of the present technology being an electronic apparatus including a solid-state imaging device, in which the solid-state imaging device includes a first semiconductor substrate on which a plurality of pixels including a first pixel is arrayed, a second semiconductor substrate including an A/D conversion unit configured to perform A/D conversion on a read signal read from the first pixel, and a third semiconductor substrate including a memory unit, the first semiconductor substrate, the second semiconductor substrate, and the third semiconductor substrate are laminated in three layers such that the first semiconductor substrate is the uppermost layer, the read signal includes a first noise signal and a first data signal obtained in a first frame, and a second data signal obtained in a second frame, the memory unit records the first noise signal, and the A/D conversion unit performs first A/D conversion according to the first data signal and the first noise signal and performs second A/D conversion according to the second data signal and the first noise signal.

According to the second aspect of the present technology, from among the first noise signal and the first data signal obtained in the first frame and the second data signal obtained in the second frame, the first noise signal is recorded in the memory unit, the first A/D conversion is performed according to the first data signal and the first noise signal, and the second A/D conversion is performed according to the second data signal and the first noise signal.

Effects of the Invention

According to the first aspect of the present technology, it is possible to suppress a decrease in reading speed of the solid-state imaging device.

According to the second aspect of the present technology, it is possible to suppress a decrease in reading speed of the solid-state imaging device.

Note that the effects described here is not necessarily limited, and may be any effect described in the present disclosure.

MODE FOR CARRYING OUT THE INVENTION

Hereinafter, the best mode for carrying out the present technology (hereinafter, referred to as an embodiment) will be described in detail with reference to the drawings. Note that the description will be made in the following order.

1. Overview of present technology
2. Configuration example of solid-state imaging device according to embodiment of present technology 3. Switching between NDND driving and DD driving in units of frames by solid-state imaging device that is embodiment of present technology
   4-1. Processes during NDND driving
   4-2. Processes during DD driving
   5. Stabilization of output rate
   6. Switching between NDND driving and DD driving in units of lines by solid-state imaging device that is embodiment of present technology
   7. Modification
   8. Configuration example in a case where solid-state imaging device according to embodiment of present technology has laminated chip structure
   9. Example of application to moving object Note that in the present Description, a system means a set of a plurality of constituents (devices, modules (components), or the like), and it does not matter whether or not all the constituents are in the same case. Therefore, each of a plurality of devices housed in separate cases and connected via a network, and one device in which a plurality of modules is housed in one case is a system.

<1. Overview of Present Technology>

First, an overview of the present technology will be described.

Figure 1:
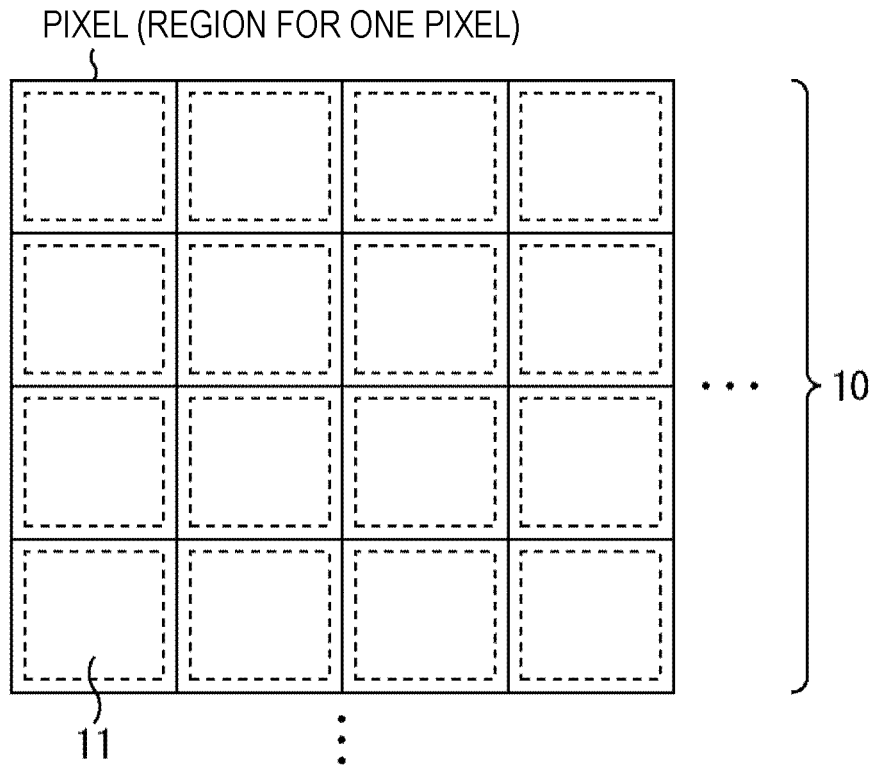
FIG. 1 is a view illustrating a configuration example of a pixel array unit in a single image sensor in which one photoelectric conversion unit is formed in a region of one pixel.

FIG. 1 illustrates a configuration example of a pixel array unit in a single sensor. One photoelectric conversion unit (photodiode or the like) 11 is formed in a region for one pixel of a pixel array unit 10 of the single sensor.

Figure 2:
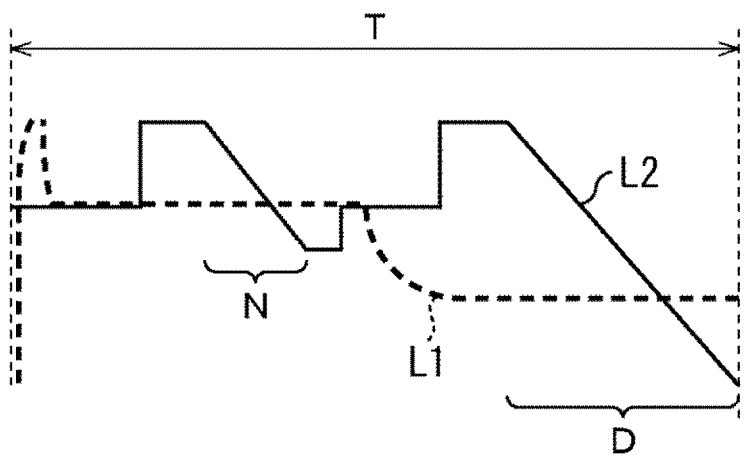
FIG. 2 is a diagram for describing ND driving by a pixel of a single sensor.

FIG. 2 is a diagram for describing a series of driving operations for A/D converting a signal read from a pixel of the single sensor illustrated in FIG. 1. Note that a period T indicates a period in which an analog voltage signal is read from one photoelectric conversion unit 11 formed in a region for one pixel and A/D conversion is performed. A dotted line L1 indicates an analog voltage signal (a noise signal and a data signal as described later) read from the pixel, and a solid line L2 indicates a reference signal that is compared with the voltage signal when the voltage signal is A/D converted.

Here, for example, in a complementary metal oxide semiconductor (CMOS) image sensor, reading and A/D conversion of the noise signal and reading and A/D conversion of the data signal are performed as driving of a pixel (reading and A/D conversion of a signal from the pixel).

In the reading and A/D conversion of the noise signal, the voltage of floating diffusion (FD) (not illustrated) of the pixel obtained immediately after the FD is reset is read as the noise signal and is A/D converted.

In the reading and A/D conversion of the data signal, the voltage of the FD obtained after electric charges generated by the photoelectric conversion unit 11 is transferred to the FD is read as the data signal and is A/D converted.

Here, a period for performing A/D conversion of the noise signal is also referred to as a period N, and a period for performing A/D conversion of the data signal is also referred to as a period D.

FIG. 2 illustrates the period N and the period D in driving of the pixel of the single sensor.

In FIG. 2, in the period N, a reference signal L2 decreases at a constant rate. Then, the value corresponding to the time from the beginning of the period N at which the reference signal L2 starts to decrease to when the reference signal L2 matches the voltage signal L1 as the noise signal is output as the A/D conversion result of the noise signal.

In the period D, the reference signal L2 decreases at a constant rate. Then, the value corresponding to the time from the beginning of the period D at which the reference signal L2 starts to decrease to when the reference signal L2 matches the voltage signal L2 as the data signal is output as the A/D conversion result of the data signal.

In the single sensor, a (digital) correlated double sampling (CDS) process of obtaining a subtraction value obtained by subtracting the A/D conversion result of the noise signal from the A/D conversion result of the data signal is performed, and the subtraction value is output as a pixel signal forming an image.

As illustrated in FIG. 2, a series of driving operations of a pixel of the single sensor includes the period N during which the noise signal is A/D converted and the period D during which the data signal is A/D converted.

Hereinafter, a series of driving operations in FIG. 2 is referred to as ND driving. In the ND driving, the CDS process can be performed in the period D together with A/D conversion of the data signal.

Figure 3:
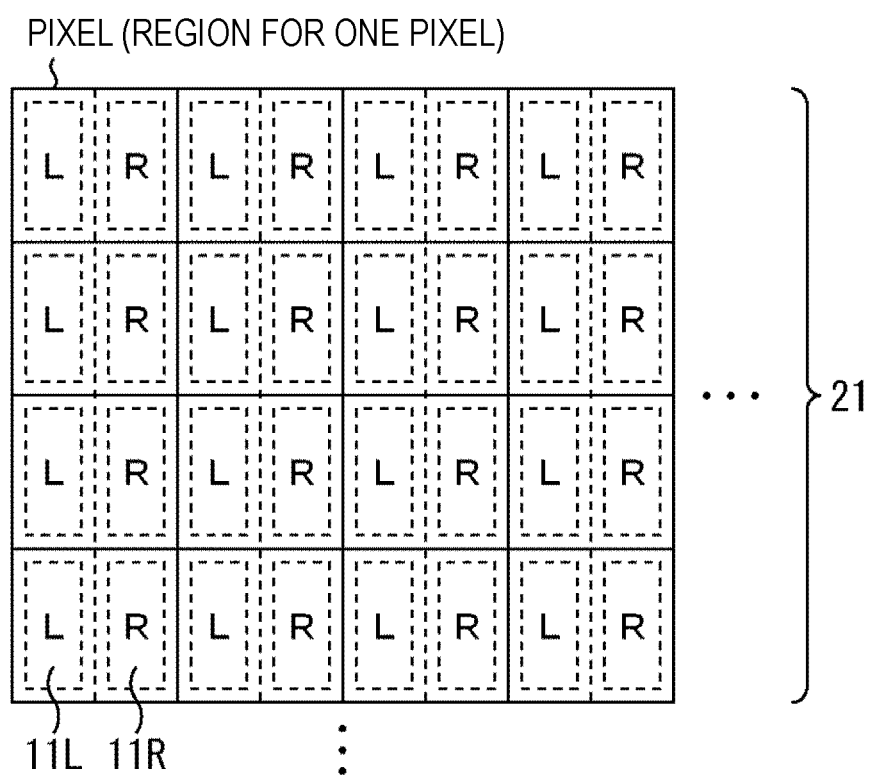
FIG. 3 is a view illustrating a configuration example of a pixel array unit in a double sensor in which two photoelectric conversion units are formed in a region of one pixel.

Next, FIG. 3 illustrates a configuration example of a pixel array unit in a double sensor. That is, a photoelectric conversion unit 11L is formed on the left half and a photoelectric conversion unit 11R is formed on the right half of the region for one pixel of a pixel array unit 21 in the double sensor.

Figure 4:
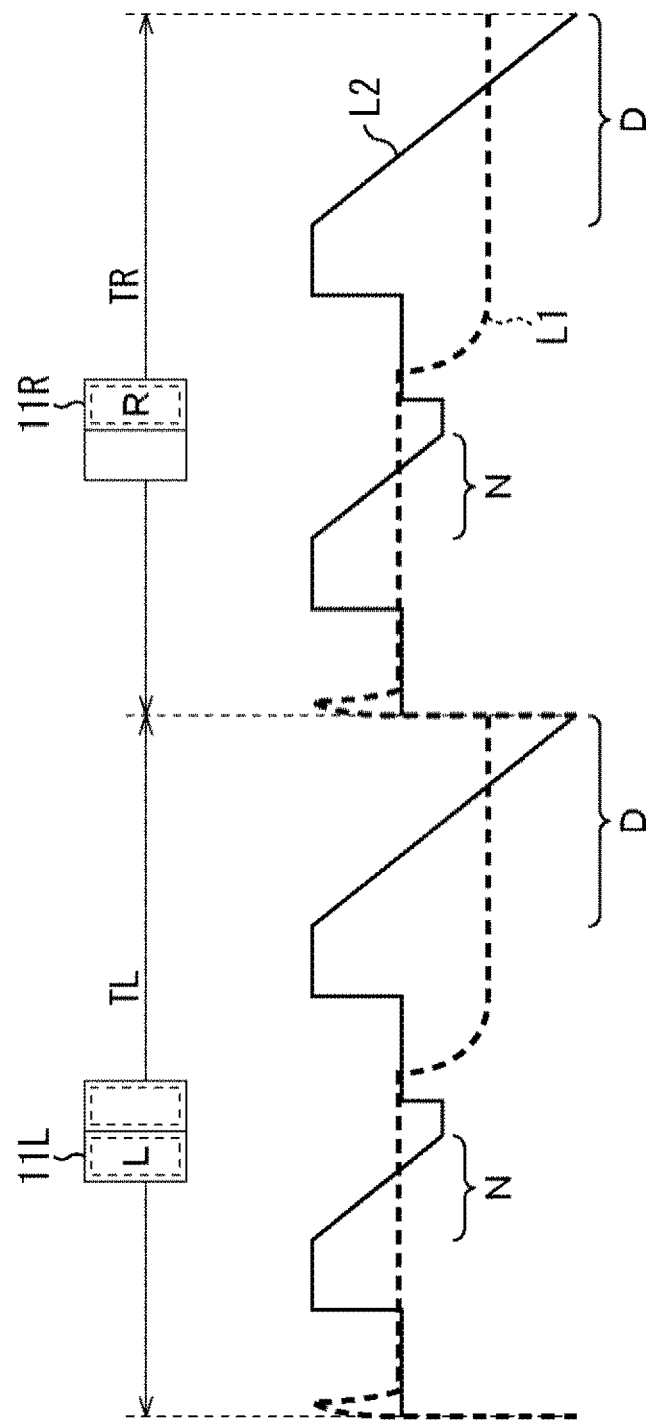
FIG. 4 is a diagram for describing NDND driving by a pixel of the double sensor.
Figure 5:
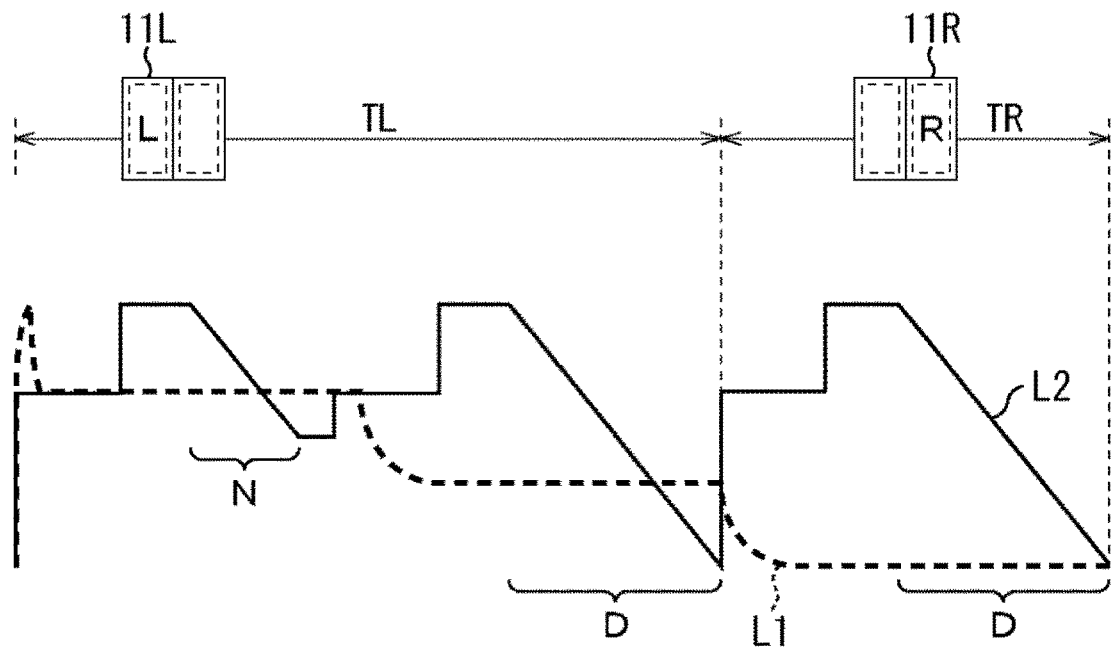
FIG. 5 is a diagram for describing NDD driving that can be assumed for a pixel of the double sensor.
Figure 6:
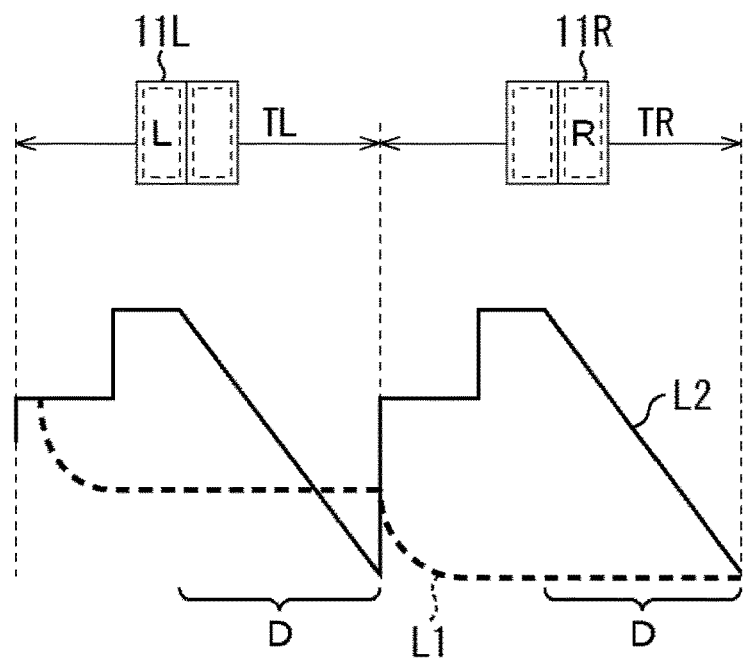
FIG. 6 is a diagram for describing DD driving applied to a pixel of the double sensor.

FIG. 4 is a diagram for explaining a series of driving operations for A/D converting a voltage signal read from a pixel of the double sensor illustrated in FIG. 3. Note that a period TL indicates a period in which a voltage signal is read from the photoelectric conversion unit 11L out of the photoelectric conversion units 11L and 11R formed in a region for one pixel and A/D conversion is performed. A period TR indicates a period in which a voltage signal is read from the photoelectric conversion unit 11R out of the photoelectric conversion units 11L and 11R formed in the region for one pixel and A/D conversion is performed. A dotted line L1 indicates an analog voltage signal read from the pixel, and a solid line L2 indicates a reference signal that is compared with the voltage signal when the voltage signal is A/D converted. FIGS. 5 and 6 as described later are similar.

As illustrated in FIG. 4, driving of the pixel of the double sensor includes a period N in which noise signal regarding the photoelectric conversion unit 11L is A/D converted a and a period D in which a data signal regarding the photoelectric conversion unit 11L is A/D converted, a period N in which a noise signal regarding the photoelectric conversion unit 11R is A/D converted, and a period D in which a data signal regarding the photoelectric conversion unit 11R is A/D converted.

Hereinafter, a series of driving operations illustrated in FIG. 4 is referred to as NDND driving. In the NDND driving (first driving), a CDS process for the photoelectric conversion unit 11L can be performed together with A/D conversion of the data signal regarding the photoelectric conversion unit 11L in the period D for the photoelectric conversion unit 11L. A CDS process for the photoelectric conversion unit 11R can be performed together with A/D conversion of the data signal regarding the photoelectric conversion unit 11R in the period D for the photoelectric conversion unit 11R.

That is, in the period N for the photoelectric conversion unit 11L, by counting the time until the reference signal L2 and the voltage signal L1 as the noise signal regarding the photoelectric conversion unit 11L match, the noise signal regarding the photoelectric conversion unit 11L can be A/D converted, that is, the count value of the time until the reference signal L2 and the voltage signal L1 as the noise signal regarding the photoelectric conversion unit 11L match can be obtained as the A/D conversion result of the noise signal regarding the photoelectric conversion unit 11L.

Moreover, in the period D for the photoelectric conversion unit 11L, by counting the time until the reference signal L2 and the voltage signal L1 as the data signal regarding the photoelectric conversion unit 11L match, the data signal regarding the photoelectric conversion unit 11L can be A/D converted, that is, the count value of the time until the reference signal L2 and the voltage signal L1 as the data signal regarding the photoelectric conversion unit 11L match can be obtained as the A/D conversion result of the data signal regarding the photoelectric conversion unit 11L.

In the period D for the photoelectric conversion unit 11L, by counting time in an opposite direction to that of A/D conversion of the noise signal (in a case where time counting in A/D conversion of the noise signal is performed by decrementing a count value, opposite direction is incrementing) by using, as the initial value, the count value as the A/D conversion result of the noise value, the CDS process for the photoelectric conversion unit 11L can be performed as (together with) A/D conversion of the data signal regarding the photoelectric conversion unit 11L.

These two pixel signals of the photoelectric conversion units 11L and 11R can be individually used for phase detection AF. Furthermore, these two pixel signals can be used as a pixel signal for one pixel of an image by being added together.

It is noted that, as is clear from comparison between FIG. 2 and FIG. 4, A/D conversion is performed twice in the period N and the period D in the ND driving, whereas A/D conversion is performed four times in the period N and the period D for the photoelectric conversion unit 11L and the period N and the period D for the photoelectric conversion unit 11R in the NDND driving. Therefore, the time required to obtain the A/D conversion result is doubled.

As a countermeasure against this, for example, the driving method illustrated in FIG. 5 is conceivable. That is, FIG. 5 is a diagram for explaining a series of driving operations that can reduce the time required in a case where A/D conversion is performed on signals read from the pixel of the double sensor illustrated in FIG. 2.

The driving illustrated in FIG. 5 includes a period N for A/D converting a noise signal regarding the photoelectric conversion unit 11L, a period D for A/D converting a data signal regarding the photoelectric conversion unit 11L, and a period D for A/D converting a data signal regarding the photoelectric conversion unit 11R.

That is, the driving illustrated in FIG. 5 is obtained by omitting the period N for A/D converting the noise signal regarding the photoelectric conversion unit 11R from the NDND driving illustrated in FIG. 4. Hereinafter, the series of driving operations illustrated in FIG. 5 is referred to as NDD driving. The pixel signal in the left half of the pixel obtained as a result of the NDD driving is subjected to the CDS process.

As is clear from comparison between FIGS. 4 and 5, it can be seen that the NDD driving can shorten the time required to obtain the A/D conversion result to ¾ of that of the NDND driving. However, in the case of comparing with the ND driving, it still takes 3/2 times longer than that of the ND driving.

Therefore, the present disclosure proposes a driving method capable of making the time required for obtaining the A/D conversion result from the double sensor equal to that of the ND driving.

FIG. 6 is a diagram for explaining DD driving proposed by the present disclosure.

The DD driving (second driving) includes a period D for A/D converting the data signal regarding the photoelectric conversion unit 11L and a period D for A/D converting the data signal regarding the photoelectric conversion unit 11R. It is noted that, in a case where only the DD driving is executed, noise signals regarding the photoelectric conversion units 11L and 11R cannot be read, and the CDS process cannot be performed. Therefore, the NDND driving is also performed before the DD driving, the noise signal read during the NDND driving is A/D converted and the obtained noise signal is recorded in the memory unit, and the obtained noise signal is used for the CDS process for removing noise from the data signal read during the DD driving to be executed thereafter.

Note that if the NDND driving is periodically executed in a short cycle, the noise signal recorded in the memory unit can be updated frequently, and the time interval between the data signal and the noise signal subjected to the CDS process can be narrowed. Therefore, the noise reduction effect can be enhanced.

<2. Configuration Example of Solid-State Imaging Device According to Embodiment of Present Technology>

Figure 7:
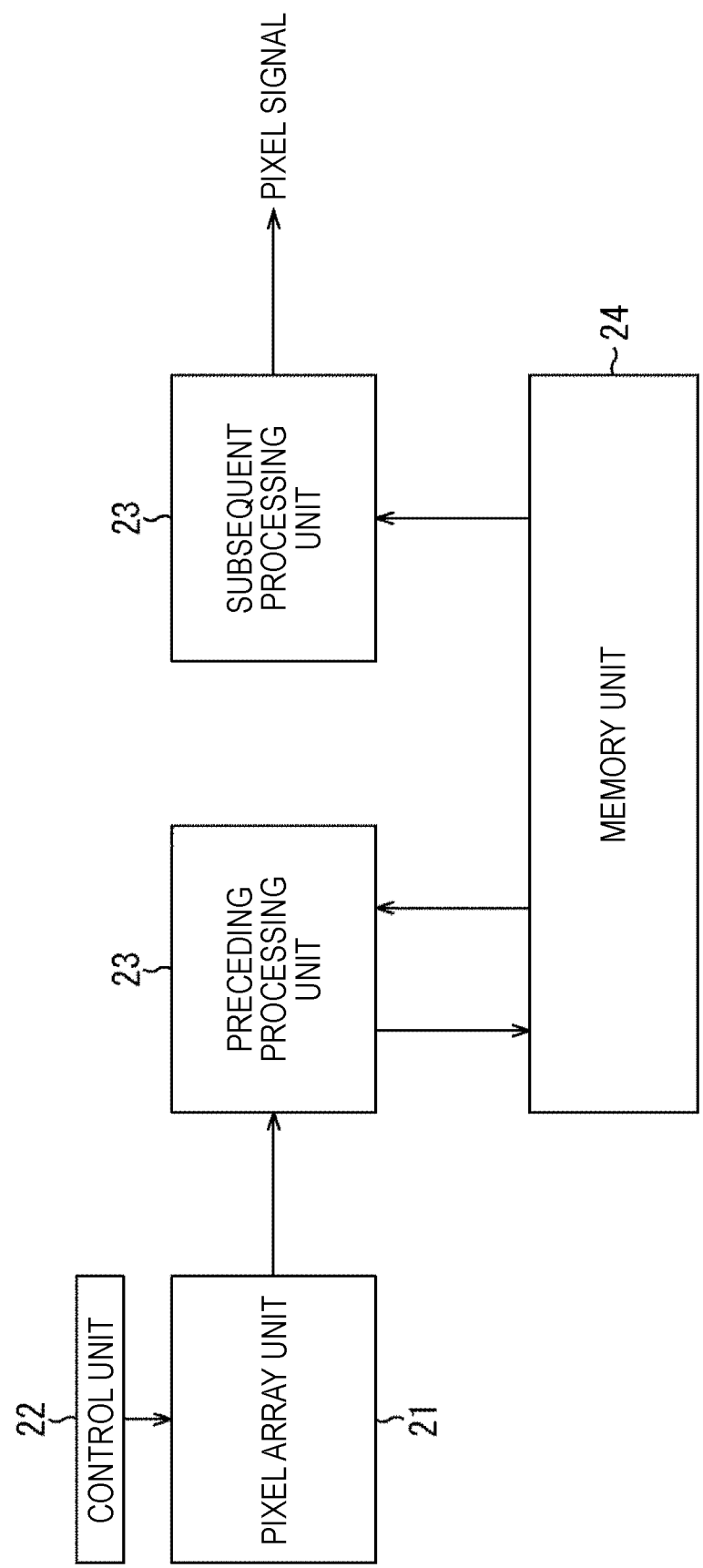
FIG. 7 is a block diagram illustrating a configuration example of a solid-state imaging device to which the present technology is applied.

Next, FIG. 7 is a block diagram illustrating a configuration example of a solid-state imaging device according to an embodiment of the present technology.

The solid-state imaging device is a double sensor, and includes a pixel array unit 21, a control unit 22, a preceding processing unit 23, a memory unit 24, and a subsequent processing unit 25.

In the pixel array unit 21, a plurality of pixels is arranged vertically and horizontally. In the region of each pixel of the pixel array unit 21, as illustrated in FIG. 3, the photoelectric conversion unit 11L is formed on the left half, and the photoelectric conversion unit 11R is formed on the right half. Note that it is assumed that the photoelectric conversion unit 11L and the photoelectric conversion unit 11R in each pixel region share the A/D conversion unit included in the preceding processing unit 23 located on a subsequent stage.

The control unit 22 controls driving of each pixel arranged in the pixel array unit 21. Specifically, it is possible to individually control reading of noise signals and data signals regarding the photoelectric conversion unit 11L and the photoelectric conversion unit 11R formed in the region of each pixel.

The preceding processing unit 23 (signal processing unit) performs a preceding process including a gain process, an A/D conversion process, a CDS process, or the like on the noise signal and the data signal read from the pixel array unit 21 by the NDND driving and the DD driving, and records the pixel signal obtained as a result of the preceding process in the memory unit 24.

Furthermore, the preceding processing unit 23 performs A/D conversion on the noise signals regarding the photoelectric conversion units 11L and 11R read from the pixel array unit 21 by the NDND driving, and records the noise signals in the memory unit 24. Moreover, the preceding processing unit 23 reads the noise signal subjected to A/D conversion and recorded in the memory unit 24, and divides the read noise signal from the data signal read by the DD driving performed after the NDND driving, and thus performs the CDS process.

The memory unit 24 includes, for example, a dynamic random access memory (DRAM), and has capacity capable of recording a pixel signal in units of frames.

The subsequent processing unit 25 (another signal processing unit) reads the pixel signal subjected to the preceding process and recorded in the memory unit 24, and performs a subsequent process including at least one of a defect correction process, a noise reduction process, or a high dynamic range (HDR) process, and outputs the pixel signal subjected to the subsequent process. Note that the subsequent processing unit 25 can perform the subsequent process at an identical rate during the NDND driving and the DD driving.

<3. Switching Between NDND Driving and DD Driving in Units of Frames by Solid-State Imaging Device that is Embodiment of Present Technology>

Figure 8:
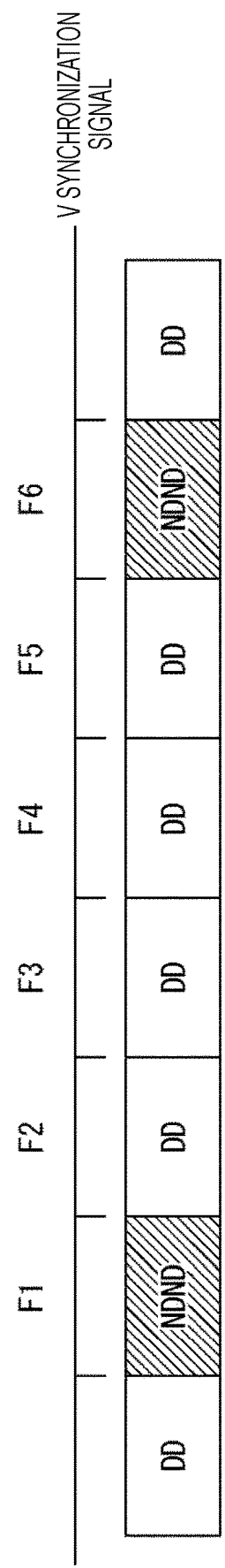
FIG. 8 is a diagram illustrating an example of switching between the NDND driving and the DD driving in units of frames.

FIG. 8 illustrates an example of switching between the NDND driving and the DD driving in units of frames by the solid-state imaging device according to an embodiment of the present technology.

In a case where switching between the NDND driving and the DD driving is performed in units of frames, switching between the NDND driving and DD driving is periodically performed in synchronization with a vertical synchronization signal (V synchronization signal).

In the case of FIG. 8, the NDND driving is performed every time the DD driving has been performed four times. For example, the NDND driving is performed on the frame numbered F1. The DD driving is performed on frames numbered F2 to F5, and the NDND driving is performed on a frame numbered F6.

<4-1. Processes During NDND Driving>

Figure 9:
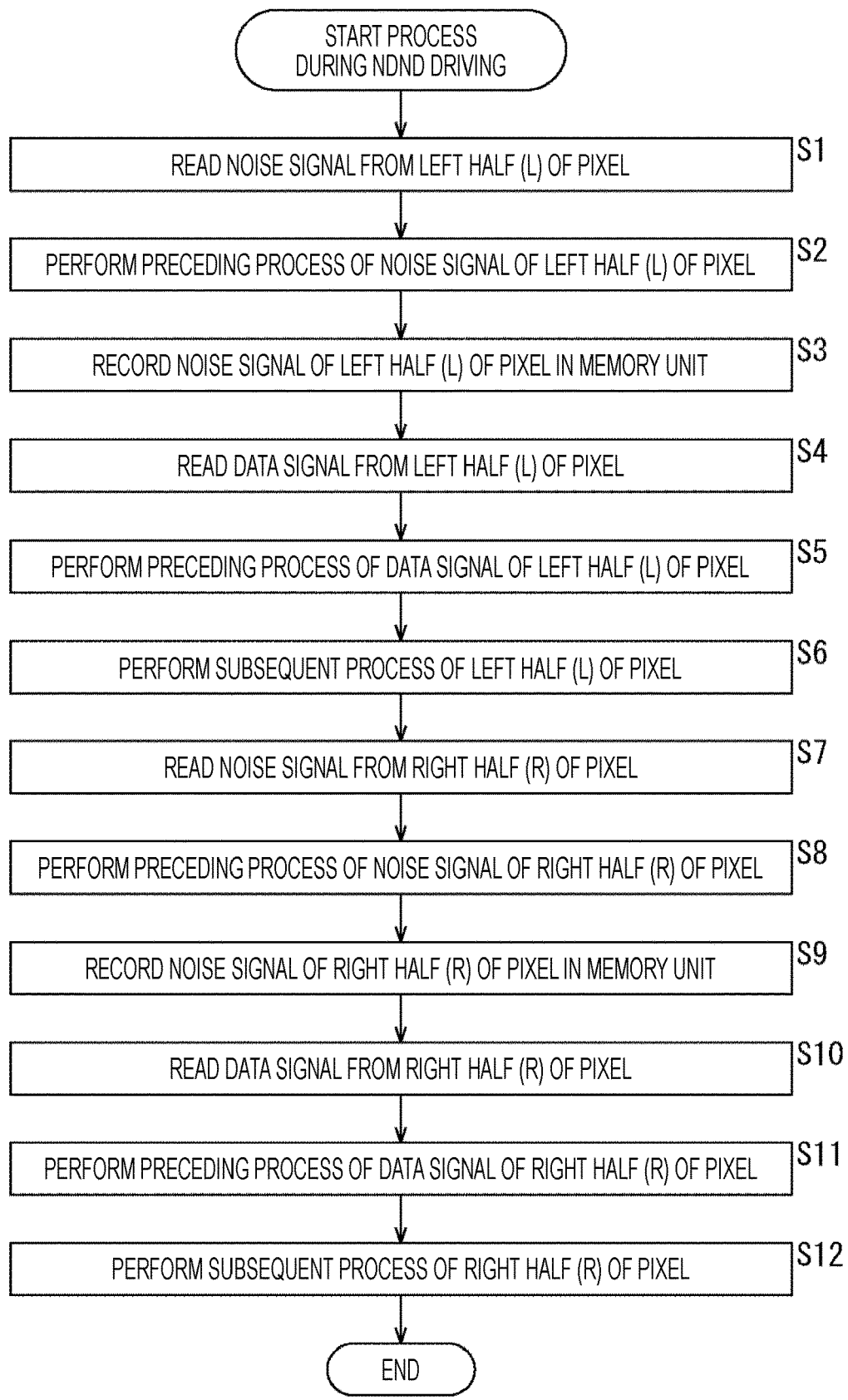
FIG. 9 is a flowchart for describing processes during the NDND driving.

FIG. 9 is a flowchart for explaining processes during the NDND driving by the solid-state imaging device according to an embodiment of the present technology.

In step S1, the pixel array unit 21 reads a noise signal (first noise signal) regarding the photoelectric conversion unit 11L of each pixel and outputs the noise signal to the preceding processing unit 23 in accordance with control from the control unit 22.

In step S2, the preceding processing unit 23 performs A/D conversion as the preceding process of the read noise signal regarding the photoelectric conversion unit 11L, and in step S3, records (the A/D conversion result of) the noise signal in the memory unit 24. The noise signal recorded in the memory unit 24 is used in the processes during the DD driving as described later.

In step S4, the pixel array unit 21 reads a data signal (first data signal) regarding the photoelectric conversion unit 11L of each pixel and outputs the data signal to the preceding processing unit 23 in accordance with control from the control unit 22.

In step S5, the preceding processing unit 23 performs A/D conversion as the preceding process of the data signal regarding the photoelectric conversion unit 11L. The A/D conversion (first A/D conversion) of the data signal regarding the photoelectric conversion unit 11L in step S5 is performed according to the A/D conversion results of the data signal regarding the photoelectric conversion unit 11L and the noise signal regarding the photoelectric conversion unit 11L obtained in step S2 performed immediately before. That is, for example, as described with reference to FIG. 4, the A/D conversion of the data signal regarding the photoelectric conversion unit 11L in step S5 is performed by using, as an initial value, the count value as the A/D conversion result of the noise signal regarding the photoelectric conversion unit 11L. Therefore, the CDS process is also performed.

The preceding processing unit 23 sequentially records the digital signal obtained by A/D conversion of the data signal regarding the photoelectric conversion unit 11L in the memory unit 24 for each line as a pixel signal subjected to the preceding process, corresponding to the photoelectric conversion unit 11L.

In step S6, the subsequent processing unit 25 reads, in units of lines, the pixel signal subjected to the preceding process, corresponding to the photoelectric conversion unit 11L, which is sequentially recorded in the memory unit 24, performs the subsequent process, and outputs the pixel signal subjected to the subsequent process.

Note that the start of the process in step S6 does not need to wait until the pixel signal for one frame, subjected to the preceding process, is recorded in the memory unit 24 according to the process in step S5, and may be executed every time the pixel signal subjected to the preceding process is recorded in the memory unit 24 in units of lines.

In step S7, the pixel array unit 21 reads a noise signal (first noise signal) regarding the photoelectric conversion unit 11R of each pixel and outputs the noise signal to the preceding processing unit 23 in accordance with control from the control unit 22.

In step S8, the preceding processing unit 23 performs A/D conversion as the preceding process of the read noise signal regarding the photoelectric conversion unit 11R, and in step S9, records (the A/D conversion result of) the noise signal in the memory unit 24. The noise signal recorded in the memory unit 24 is used in the processes during the DD driving as described later.

In step S10, the pixel array unit 21 reads a data signal (first data signal) regarding the photoelectric conversion unit 11R of each pixel and outputs the data signal to the preceding processing unit 23 in accordance with control from the control unit 22.

In step S11, the preceding processing unit 23 performs A/D conversion as the preceding process of the data signal regarding the photoelectric conversion unit 11R. The A/D conversion (first A/D conversion) of the data signal regarding the photoelectric conversion unit 11R in step S11 is performed according to the A/D conversion results of the data signal regarding the photoelectric conversion unit 11R and the noise signal regarding the photoelectric conversion unit 11L obtained in step S8 performed immediately before. That is, for example, as described with reference to FIG. 4, the A/D conversion of the data signal regarding the photoelectric conversion unit 11R in step S11 is performed by using, the initial value, the count value as the A/D conversion result of the noise signal for the photoelectric conversion unit 11R. Therefore, the CDS process is also performed.

The preceding processing unit 23 sequentially records the digital signal obtained by A/D conversion of the data signal regarding the photoelectric conversion unit 11R in the memory unit 24 for each line, as a pixel signal subjected to the preceding process, corresponding to the photoelectric conversion unit 11R.

In step S12, the subsequent processing unit 25 reads, in units of lines, the pixel signal subjected to the preceding process, corresponding to the photoelectric conversion unit 11R, which are sequentially recorded in the memory unit 24, performs the subsequent process, and outputs pixel signals subjected to the subsequent process.

Note that the start of the process in step S12 does not need to wait until the pixel signal for one frame, subjected to the preceding process, is recorded in the memory unit 24 in the process in step S11, and can be executed every time the pixel signals subjected to the preceding process is recorded in the memory unit 24 in units of lines.

This is the end of description of the processes during the NDND driving.

<4-2. Processes During DD Driving>

Figure 10:
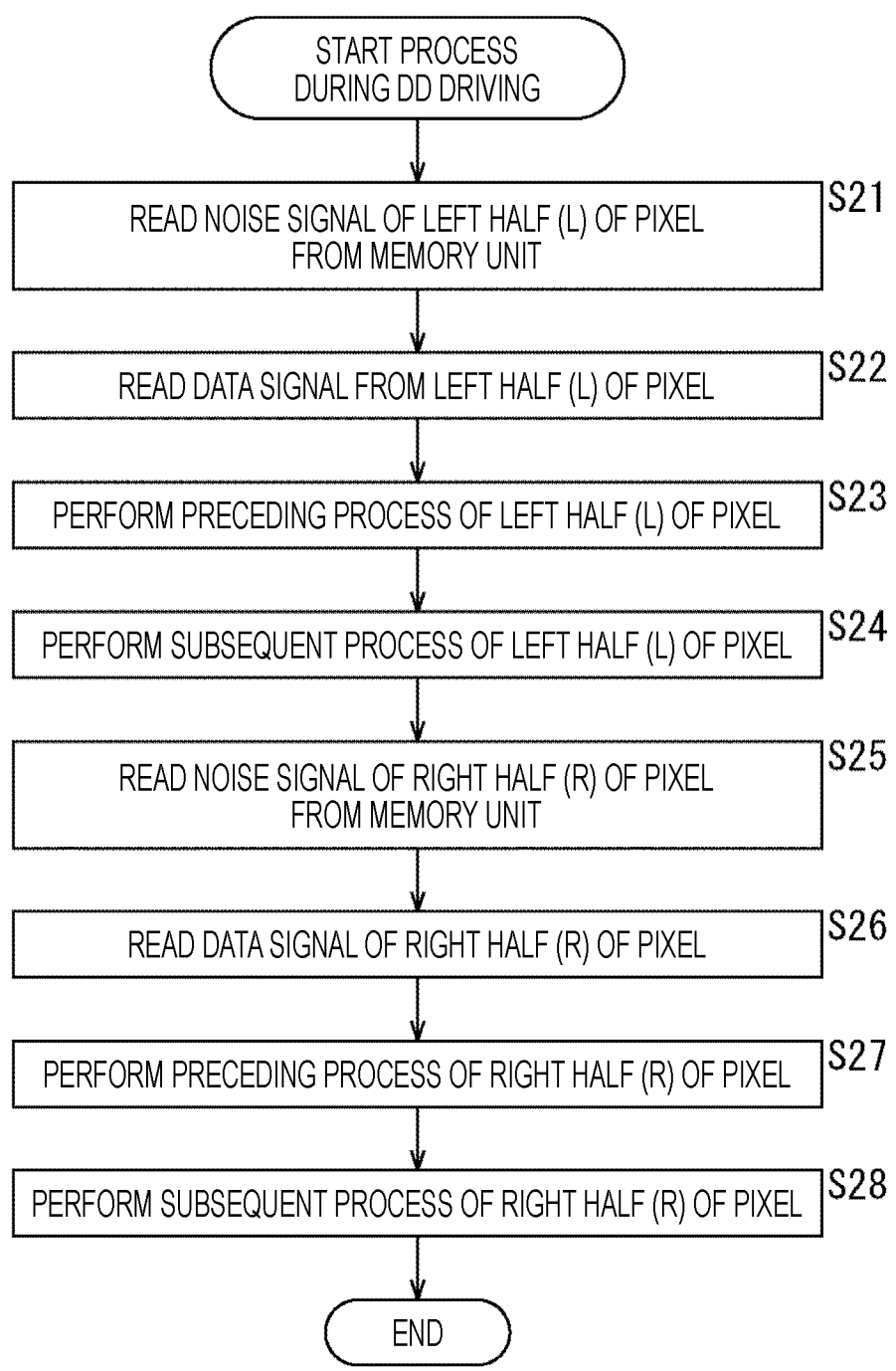
FIG. 10 is a flowchart for explaining processes during the DD driving.

FIG. 10 is a flowchart for explaining processes during the DD driving by the solid-state imaging device according to an embodiment of the present technology.

In step S21, the preceding processing unit 23 reads the noise signal (first noise signal) regarding the photoelectric conversion unit 11L, recorded in the memory unit 24 in the previous NDND driving.

In step S22, the pixel array unit 21 reads a data signal (second data signal) regarding the photoelectric conversion unit 11L of each pixel and outputs the data signal to the preceding processing unit 23 in accordance with control from the control unit 22.

In step S23, the preceding processing unit 23 performs A/D conversion as the preceding process of the data signal regarding the photoelectric conversion unit 11L. The A/D conversion (second A/D conversion) of the data signal regarding the photoelectric conversion unit 11L in step S23 is performed according to the A/D conversion results of the data signal regarding the photoelectric conversion unit 11L and the noise signal read from the memory unit 24 in step S21, that is, the noise signal regarding the photoelectric conversion unit 11L obtained by the NDND driving performed (immediately) before. That is, for example, as described with reference to FIG. 4, the A/D conversion of the data signal regarding the photoelectric conversion unit 11L in step S23 is performed by using, as the initial value, the count value as the A/D conversion result of the noise signal read from the memory unit 24. Therefore, the CDS process is also performed.

The preceding processing unit 23 sequentially records the digital signal obtained by A/D conversion of the data signal regarding the photoelectric conversion unit 11L in the memory unit 24 for each line, as a pixel signal subjected to the preceding process, corresponding to the photoelectric conversion unit 11L.

In step S24, the subsequent processing unit 25 reads, in units of lines, the pixel signal subjected to the preceding process, corresponding to the photoelectric conversion unit 11L, which is recorded in the memory unit 24, performs the subsequent process, and outputs the pixel signal subjected to the subsequent process.

Note that the start of the process in step S24 does not need to wait until the pixel signal for one frame, subjected to the preceding process is recorded in the memory unit 24 in the process in step S23, and may be executed every time the pixel signal subjected to the preceding process is recorded in the memory unit 24 in units of lines.

In step S25, the preceding processing unit 23 reads a noise signal (first noise signal) recorded in the memory unit 24, regarding the photoelectric conversion unit 11R by the previous NDND driving.

In step S26, the pixel array unit 21 reads a data signal (second data signal) regarding the photoelectric conversion unit 11R of each pixel and outputs the data signal to the preceding processing unit 23 in accordance with control from the control unit 22.

In step S27, the preceding processing unit 23 performs A/D conversion as the preceding process of the data signal regarding the photoelectric conversion unit 11R. A/D conversion (second A/D conversion) of the data signal regarding the photoelectric conversion unit 11R in step S27 is performed according to the A/D conversion results of the data signal regarding the photoelectric conversion unit 11R and the noise signal read from the memory unit 24 in step S25, that is the noise signal regarding the photoelectric conversion unit 11R obtained by the NDND driving performed (immediately) before. That is, for example, as described with reference to FIG. 4, the A/D conversion of the data signal for the photoelectric conversion unit 11R in step S27 is performed by using, as an initial value, the count value as the A/D conversion result of the noise signal read from the memory unit 24. Therefore, the CDS process is also performed.

The preceding processing unit 23 sequentially records the digital signal obtained by the A/D conversion of the data signal regarding the photoelectric conversion unit 11R in the memory unit 24 for each line, as a pixel signal subjected to the preceding process, corresponding to the photoelectric conversion unit 11R.

In step S28, the subsequent processing unit 25 reads, in units of lines, the pixel signal subjected to the preceding process, corresponding to the photoelectric conversion unit 11R, which is recorded in the memory unit 24, performs the subsequent process, and outputs pixel signal subjected to the subsequent process.

Note that the start of the process in step S28 does not need to wait until the pixel signal for one frame, subjected to the preceding process, is recorded in the memory unit 24 in the process in step S27, and can be executed every time the pixel signal subjected to the preceding process is recorded in the memory unit 24 in units of lines.

Note that the CDS process performed together with the A/D conversion of the data signal included in the preceding process performed in steps S23 and S27 is inferior to the case of using the noise signal of the same frame as that of the data signal because the noise signal in the previous NDND driving (up to four frames before in the case of FIG. 8) performed periodically; however, an effect close to the case where the noise signal of the same frame as that of the data signal is used is observed.

This is the end of description of the processes during the DD driving.

<5. Stabilization of Output Rate>

Usually, the time required for the preceding process for one frame is shorter than the time required for the subsequent process for one frame. Furthermore, the time required for the preceding process for one frame is longer in the NDND driving than in the DD driving. In contrast, the time required for the subsequent process for one frame does not change between the NDND driving and the DD driving.

Furthermore, in a case where a configuration in which a memory unit 24 is not provided between a preceding processing unit 23 and a subsequent processing unit 25 is assumed, the time difference required for the NDND driving and the DD driving directly affects the time required for the preceding process and the subsequent process for one frame. Therefore, in a case where switchover between the NDND driving and the DD driving is performed, the output rate of the pixel data subjected to the subsequent process changes.

In contrast, in the solid-state imaging device according to the embodiment of the present technology, since the memory unit 24 is provided between the preceding processing unit 23 and the subsequent processing unit 25, the preceding process performed by the preceding processing unit 23 and the subsequent process performed by the subsequent processing unit 25 can be executed individually and in parallel.

Figure 11:
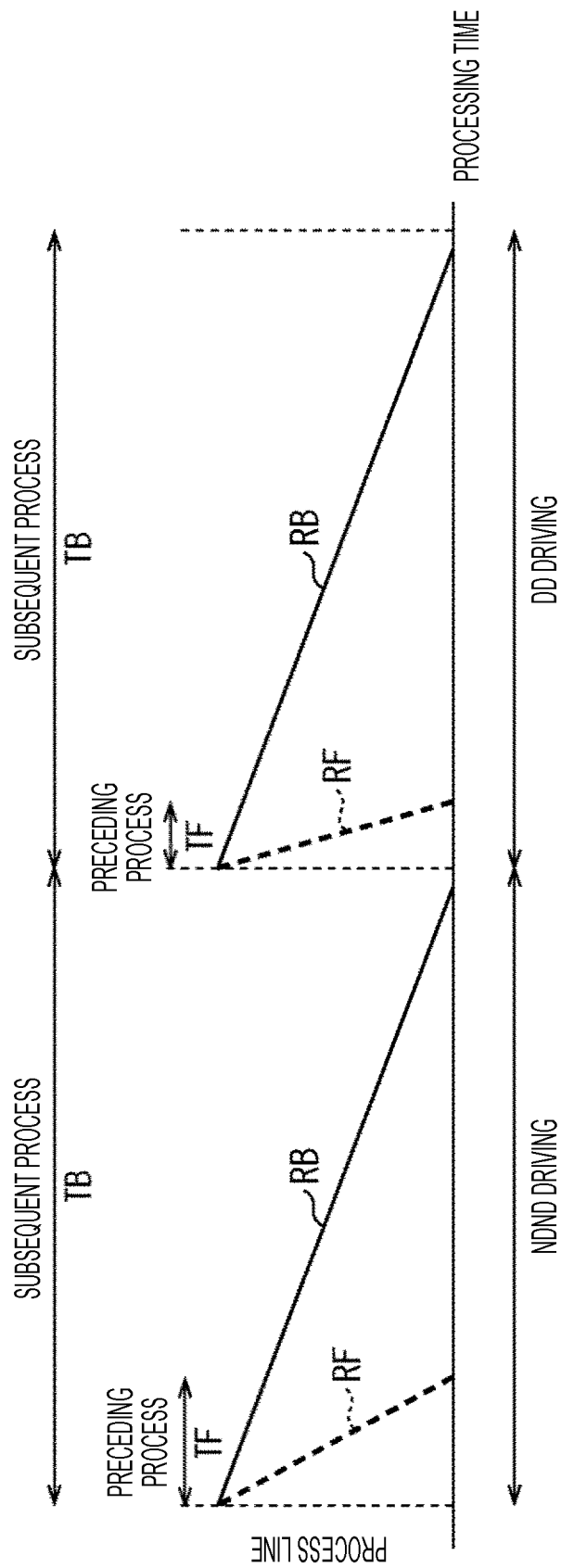
FIG. 11 is a diagram illustrating effects of executing a preceding process and a subsequent process in parallel.

FIG. 11 illustrates the effect of being able to perform the preceding process by the preceding processing unit 23 and the subsequent process by the subsequent processing unit 25 individually and in parallel.

In FIG. 11, the horizontal axis represents the processing time of the preceding process and the subsequent process, and the vertical axis represents the line (process line) to be processed in the preceding process and the subsequent process.

In a case where the preceding process and subsequent process are executed individually in parallel, the time TB required for the subsequent process is constant and the time TF required for the preceding process changes. However, when the time TB required for the subsequent process is longer than the time TF required for the preceding process, even if the processing rate RF of the preceding process changes due to a change in the time TF required for the preceding process between the NDND driving and the DD driving, the processing rate RB of the subsequent process can be made constant, that is, the output rate of the pixel signal subjected to the subsequent process can be made constant.

<6. Switching Between NDND Driving and DD Driving in Units of Lines by Solid-State Imaging Device that is Embodiment of Present Technology>

Figure 12:
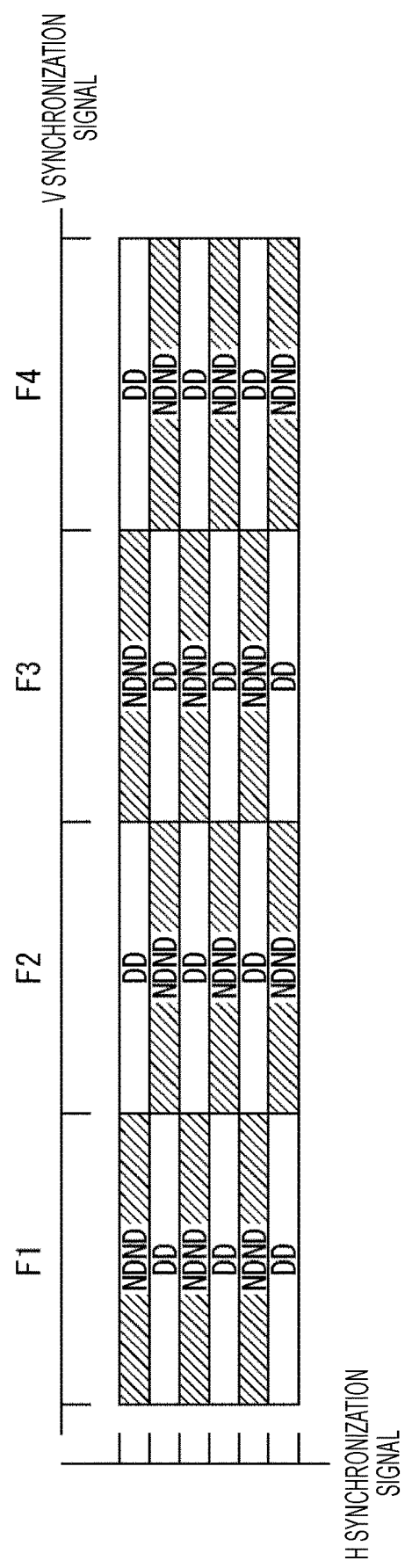
FIG. 12 is a diagram illustrating an example of switching between the NDND driving and the DD driving in units of lines.

Next, FIG. 12 illustrates an example of switching between the NDND driving and the DD driving in units of lines by the solid-state imaging device according to an embodiment of the present technology.

In a case where switching between the NDND driving and the DD driving is performed in units of lines, switching between the NDND driving and the DD driving is periodically performed in units of lines in synchronization with a horizontal synchronization signal (H synchronization signal).

It is noted that, the NDND driving is applied to one of the lines at the same location in successive frames, and the DD driving is applied to the other line. Moreover, in the preceding process in the line to which the DD driving is applied, the noise signal for the one line of the previous frame to which the NDND driving is applied is used.

Specifically, in a case where the NDND driving is applied to the odd lines of the frame numbered F1, and the DD driving is applied to the even lines of the frame numbered F1, the DD driving is applied to the odd lines of the frame numbered F2, and the NDND driving is applied to the even lines of the frame numbered F2. Then, the noise signal of the even line at the same location to which the NDND driving of the frame numbered F1 is applied is used for the preceding process of the odd line of the frame numbered F2 to which the DD driving is applied.

In the case of switching in units of lines illustrated in FIG. 12, since frequency of switching between the NDND driving and the DD driving is higher than that in switching in units of frames illustrated in FIG. 8, the time required for the preceding process for one frame is longer. However, even though the frame interval between the data signal and the noise signal used for the CDS process in the preceding process is four frames at the maximum in the case of FIG. 8 in switching in units of lines, the frame interval is one frame in the case of switching in units of lines. Therefore, switching in units of lines can improve the effect of noise removal by the CDS process more than switching in units of frames.

<7. Modification>

In the solid-state imaging device according to an embodiment of the present technology, the photoelectric conversion unit 11 is formed in each of the left half and the right half of the region for one pixel; however, the photoelectric conversion unit 11 may be formed in each of the upper half and the lower half of the region for one pixel.

Furthermore, the present technology can be applied even in a case where three or more photoelectric conversion units are formed in the region for one pixel.

Moreover, in a single sensor in which one photoelectric conversion unit is formed in a region for one pixel, switching may be performed between ND driving for reading a data signal after reading a noise signal and D driving omitting reading of a noise signal and reading only a data signal.

Figure 13A:
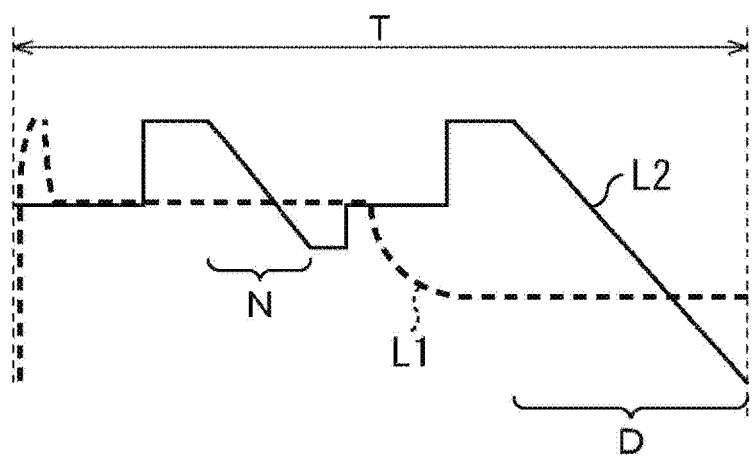
FIGS. 13A and 13B is a diagram for describing the ND driving and the D driving in the single sensor.
Figure 13B:
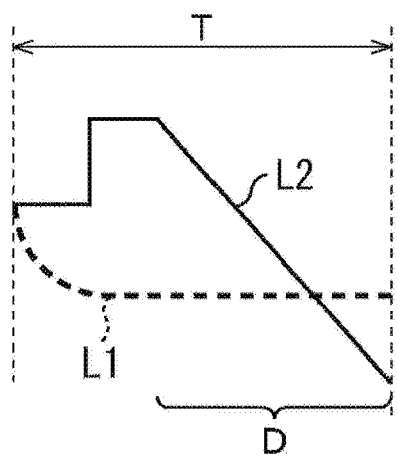

FIGS. 13A and 13B illustrate ND driving and D driving in a single sensor. FIG. 13A illustrates the ND driving in the single sensor. Since the ND driving is similar to that in FIG. 2, the description thereof is omitted. FIG. 13B illustrates the D driving in the single sensor. In the D driving, there is no period N and there is a period D, compared to the ND driving. The time required for the D driving is ½ of that of the ND driving. Therefore, by performing the D driving, the signal reading speed from the single sensor can be increased.

Figure 14:
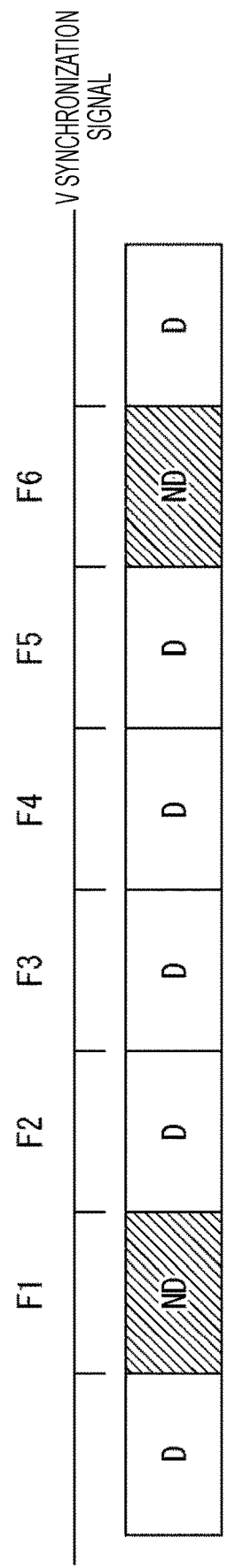
FIG. 14 is a diagram illustrating an example of switching between the ND driving and the D driving in units of frames.

FIG. 14 is a diagram for explaining driving in which switching is periodically performed between the D driving and the ND driving in units of frames in synchronization with a vertical synchronization signal (V synchronization signal) in the single sensor.

In the case of FIG. 14, the ND driving is performed every time the D driving has been performed four times. For example, the ND driving is applied to a frame numbered F1, the D driving is applied to frames numbered F2 to F5, and the ND driving is applied to a frame numbered F6.

Figure 15:
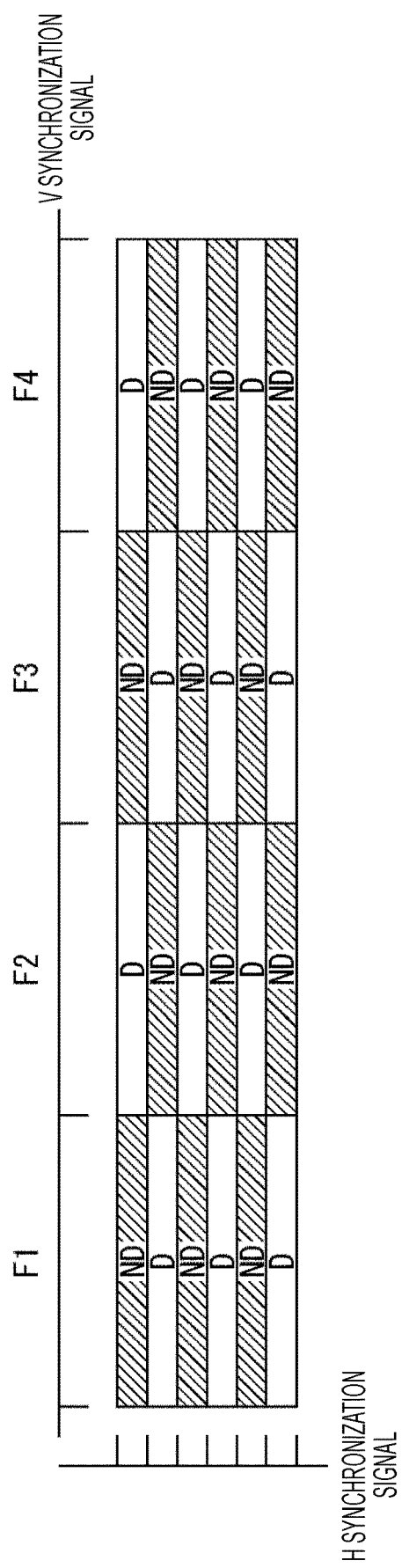
FIG. 15 is a diagram illustrating an example of switching between the ND driving and the D driving in units of lines.

FIG. 15 is a diagram for explaining driving in which switching is periodically performed between the D driving and the ND driving in units of lines in synchronization with a horizontal synchronization signal (H synchronization signal) in the single sensor.

It is noted that, the ND driving is applied to one of the lines at the same location in successive frames and the D driving is applied to the other line. Moreover, in the preceding process in the line to which the D driving is applied, the noise signal for the one line to which the ND driving of the previous frame is applied is used.

Specifically, in a case where the ND driving is applied to the odd lines of the frame numbered F1 and the D driving is applied to the even lines of the frame numbered F1, the D driving is applied to the odd lines of the frame numbered F2 and the ND driving is applied to the even lines of the frame numbered F2. Then, the noise signal of the even line at the same location to which the ND driving of the frame numbered F1 is applied is used for the preceding process of the odd line of the frame numbered F2 to which the D driving is applied.

In the case of switching in units of lines illustrated in FIG. 15, since frequency of switching between the ND driving and the D driving is higher than that in switching in units of frames illustrated in FIG. 14, the time required for the preceding process for one frame is longer. However, even though the frame interval between the data signal and the noise signal used for the CDS process in the preceding process is four frames at the maximum in the case of FIG. 14 in switching in units of lines, the frame interval is one frame in the case of switching in units of lines. Therefore, switching in units of lines can improve the effect of noise removal by the CDS process more than switching in units of frames.

<8. Configuration Example in a Case where Solid-State Imaging Device According to Embodiment of Present Technology has Laminated Chip Structure>

A solid-state imaging device according to an embodiment of the present technology may adopt a laminated chip structure formed by laminating a plurality of chips.

Figure 16A:
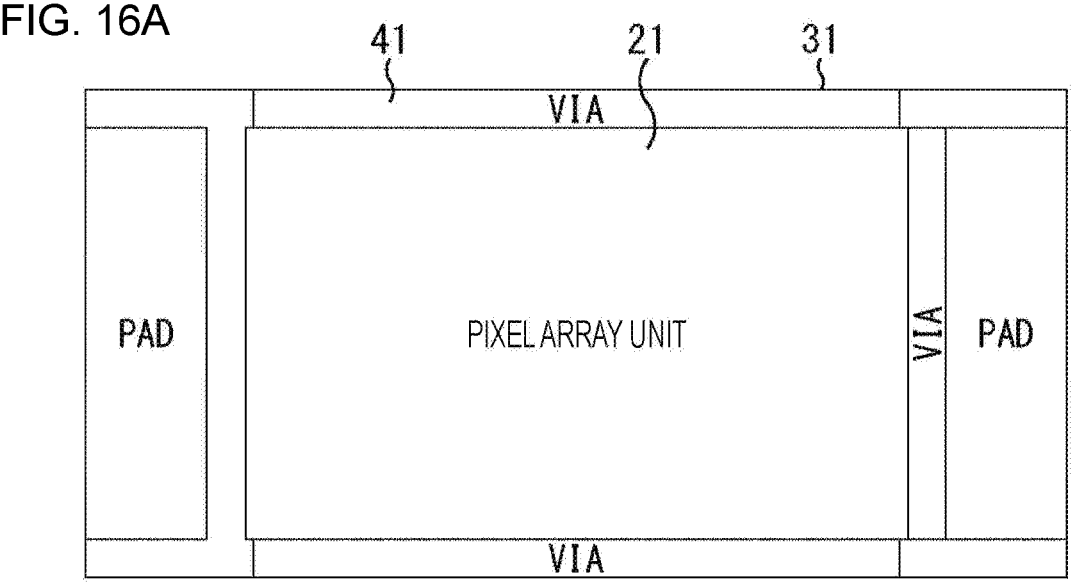
FIGS. 16A and 16B is a plan view illustrating a configuration example in a case where the solid-state imaging device in FIG. 7 is a two-layer laminated chip.
Figure 16B:
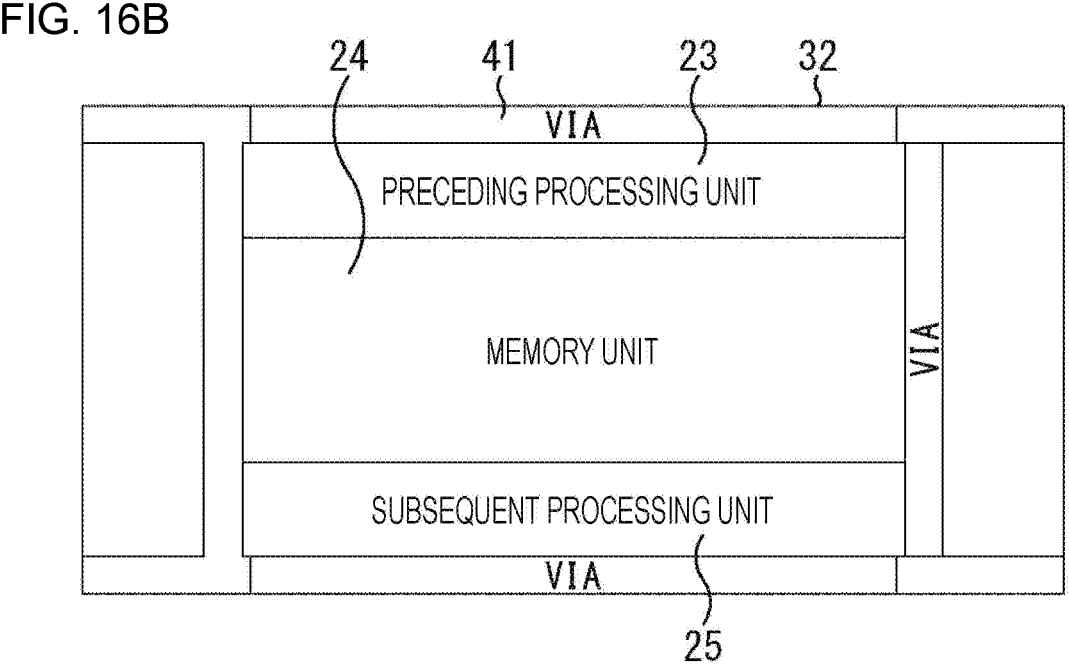

FIGS. 16A and 16B are a plan view illustrating a configuration example of a case where a solid-state imaging device according to an embodiment of the present technology is configured by laminating first and second chips. FIG. 16A illustrates a first chip 31, and FIG. 16B illustrates a second chip 32.

That is, in FIGS. 16A and 16B, the solid-state imaging device according to the embodiment of the present technology adopts a laminated chip structure configured by laminating the first chip 31 on which a pixel array unit 21 is formed, and a second chip 32 on which a preceding processing unit 23, a memory unit 24, and a subsequent processing unit 25 are formed.

The pixel array unit 21 formed on the first chip 31 and the subsequent processing unit 25 formed on the second chip 32 are connected via a via (VIA) 41.

Figure 17A:
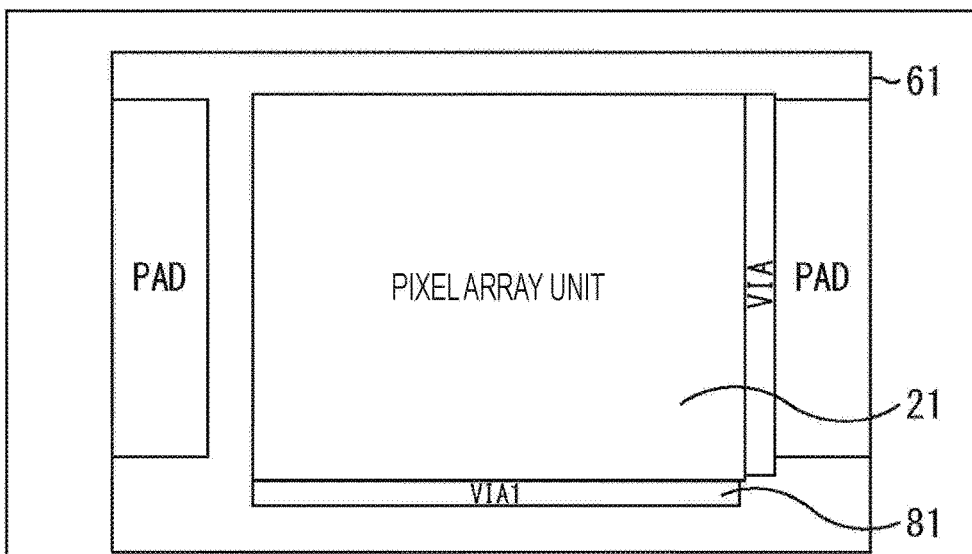
FIGS. 17A, 17B, and 17C is a plan view illustrating a configuration example in a case where the solid-state imaging device in FIG. 7 is a three-layer laminated chip.
Figure 17B:
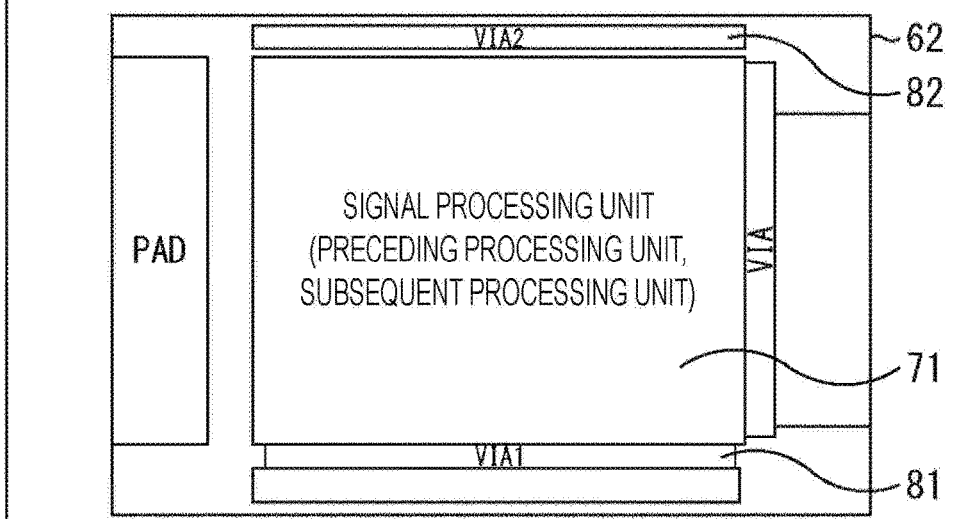
Figure 17C:
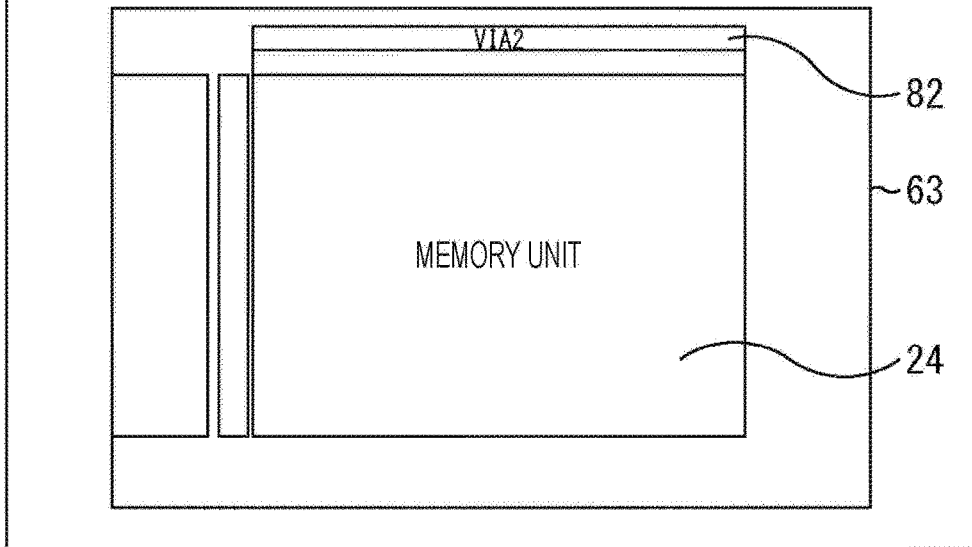

Next, FIGS. 17A, 17B, and 17C are block diagrams illustrating configuration examples in a case where a solid-state imaging device according to an embodiment of the present technology is configured by laminating first to third chips. FIG. 17A illustrates a first chip 61 (first semiconductor substrate), FIG. 17B illustrates a second chip 62 (second semiconductor substrate), and FIG. 17C illustrates a third chip 63 (third semiconductor substrate).

That is, in FIGS. 17A, 17B, and 17C, the solid-state imaging device according to an embodiment of the present technology adopts a laminated chip structure configured by laminating the first chip 61 on which a pixel array unit 21 is formed, a second chip 62 on which a signal processing unit 71 corresponding to a preceding processing unit 23 and a subsequent processing unit 25 are formed, and a third chip 63 on which a memory unit 24 are laminated.

The pixel array unit 21 formed on the first chip 61 and the signal processing unit 71 formed on the second chip 62 are connected via a via 81. The signal processing unit 71 formed on the second chip 62 and the memory unit 24 formed on the third chip 63 are connected via a via 82.

<9. Example of Application to Moving Object>

The technology according to the present disclosure (the present technology) can be applied to various products. For example, the technology according to the present disclosure may be realized as a device mounted on any type of a moving object such as an automobile, an electric car, a hybrid electric car, a motorcycle, a bicycle, a personal mobility vehicle, an airplane, a drone, a ship, or a robot.

Figure 18:
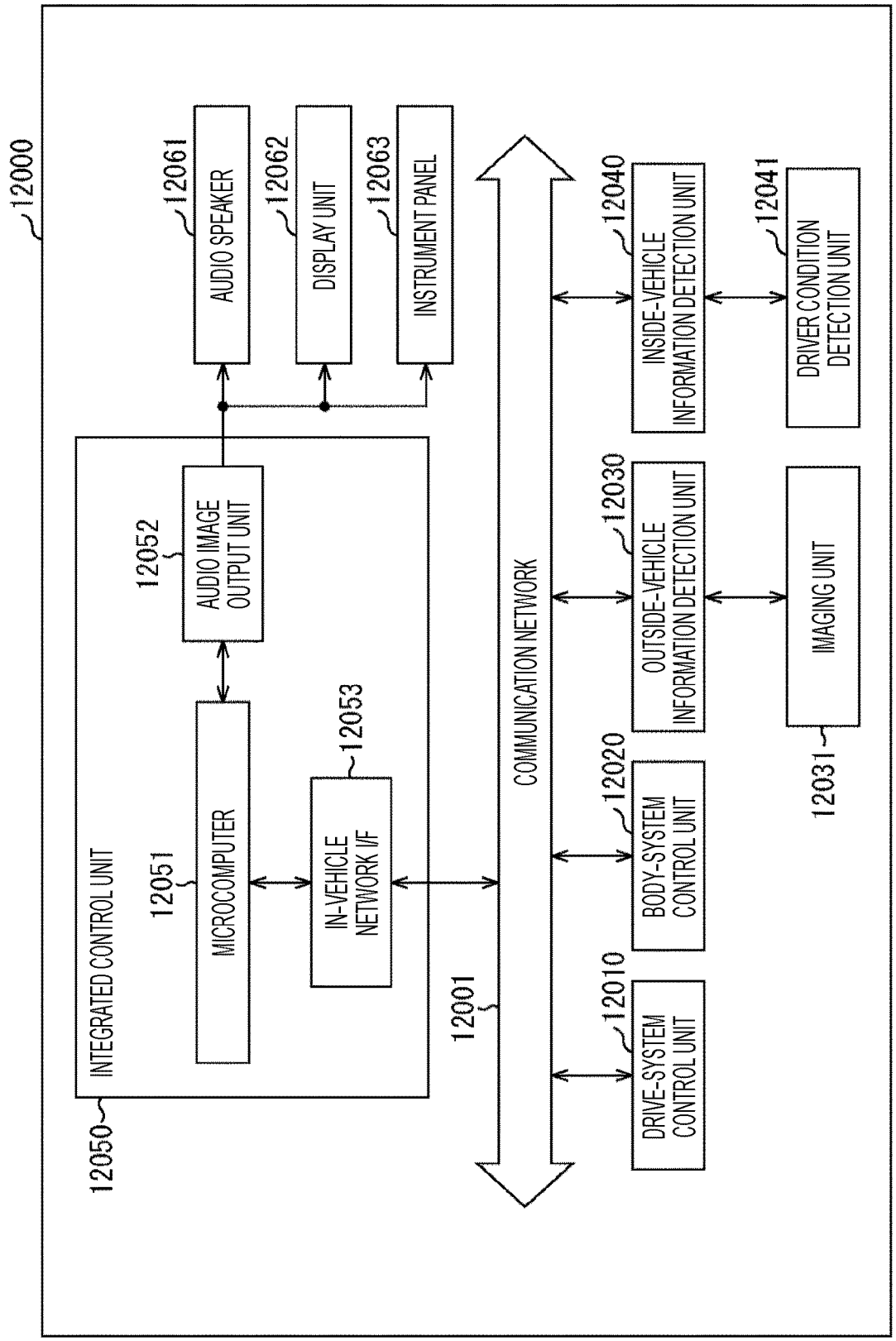
FIG. 18 is a block diagram illustrating an example of a schematic configuration of a vehicle control system.

FIG. 18 is a block diagram illustrating a schematic configuration example of a vehicle control system which is an example of a moving object control system to which the technology according to the present disclosure can be applied.

A vehicle control system 12000 includes a plurality of electronic control units connected via a communication network 12001. In the example illustrated in FIG. 18, the vehicle control system 12000 includes a drive-system control unit 12010, a body-system control unit 12020, an outside-vehicle information detection unit 12030, an inside-vehicle information detection unit 12040, and an integrated control unit 12050. Furthermore, as a functional configuration of the integrated control unit 12050, a microcomputer 12051, an audio image output unit 12052, and an in-vehicle network interface (I/F) 12053 are illustrated.

The drive-system control unit 12010 controls the operation of devices related to the drive system of a vehicle according to various programs. For example, the drive-system control unit 12010 functions as a control device for a drive force generation device for generating drive force of the vehicle such as an internal combustion engine or a drive motor, a drive force transmission mechanism for transmitting drive force to wheels, a steering mechanism that adjusts the steering angle of the vehicle, and a braking device that generates braking force of the vehicle.

The body-system control unit 12020 controls the operation of various devices provided on a vehicle body according to the various programs. For example, the body-system control unit 12020 functions as a control device of a keyless entry system, a smart key system, a power window device, or various lamps such as a headlamp, a back lamp, a brake lamp, a blinker, or a fog lamp. In this case, to the body-system control unit 12020, radio waves or signals of various switches transmitted from a portable machine substituting for a key can be input. The body-system control unit 12020 receives input of these radio waves or signals, and controls a door lock device, a power window device, a lamp and the like of the vehicle.

The outside-vehicle information detection unit 12030 detects information of the outside of the vehicle on which the vehicle control system 12000 is mounted. For example, an imaging unit 12031 is connected to the outside-vehicle information detection unit 12030. The outside-vehicle information detection unit 12030 causes the imaging unit 12031 to capture an image outside the vehicle, and receives the captured image. The outside-vehicle information detection unit 12030 may perform an object detection process of a person, a car, an obstacle, a sign, a character on a road surface, or the like or a distance detection process on the basis of the received image.

The imaging unit 12031 is an optical sensor that receives light and outputs an electric signal according to the amount of the light received. The imaging unit 12031 can output an electric signal as an image or can output the electric signal as distance measurement information. Furthermore, light received by the imaging unit 12031 may be visible light or invisible light such as infrared light.

The inside-vehicle information detection unit 12040 detects information of vehicle inside. For example, a driver condition detection unit 12041 that detects the condition of a driver is connected to the inside-vehicle information detection unit 12040. The driver condition detection unit 12041 includes, for example, a camera that captures an image of the driver, and the inside-vehicle information detection unit 12040 may calculate the degree of fatigue or the degree of concentration of the driver or may make a judgment as to whether or not the driver does not doze off, on the basis of detection information input from the driver condition detection unit 12041.

The microcomputer 12051 can arithmetically operate a control target value of the drive force generation device, the steering mechanism, or the braking device, on the basis of information of the inside and outside of the vehicle acquired by the outside-vehicle information detection unit 12030 or the inside-vehicle information detection unit 12040, and can output an control command to the drive-system control unit 12010. For example, the microcomputer 12051 can perform coordinated control aiming at realizing functions of an advanced driver assistance system (ADAS) including collision avoidance or shock mitigation of a vehicle, follow-up traveling based on inter-vehicle distance, traveling while maintaining vehicle speed, vehicle collision warning, vehicle lane deviation warning, or the like.

Furthermore, the microcomputer 12051 can perform coordinated control aiming at automatic driving or the like of autonomously traveling without depending on operation of the driver, by controlling the drive force generation device, the steering mechanism, the braking device, or the like on the basis of vehicle periphery information acquired by the outside-vehicle information detection unit 12030 or the inside-vehicle information detection unit 12040.

Furthermore, the microcomputer 12051 can output a control command to the body-system control unit 12020 on the basis of the outside-vehicle information acquired by the outside-vehicle information detection unit 12030. For example, the microcomputer 12051 can perform coordinated control aiming at antiglare such as switching from a high beam to a low beam by controlling the headlamp according to the position of the preceding car or the oncoming car detected by the outside-vehicle information detection unit 12030.

The audio image output unit 12052 transmits an output signal of at least one of audio or an image to an output device capable of visually or aurally notifying a passenger or the outside of the vehicle of information. In the example of FIG. 18, an audio speaker 12061, a display unit 12062, and an instrument panel 12063 are illustrated as examples of the output device. For example, the display unit 12062 may include at least one of an on-board display or a head-up display.

Figure 19:
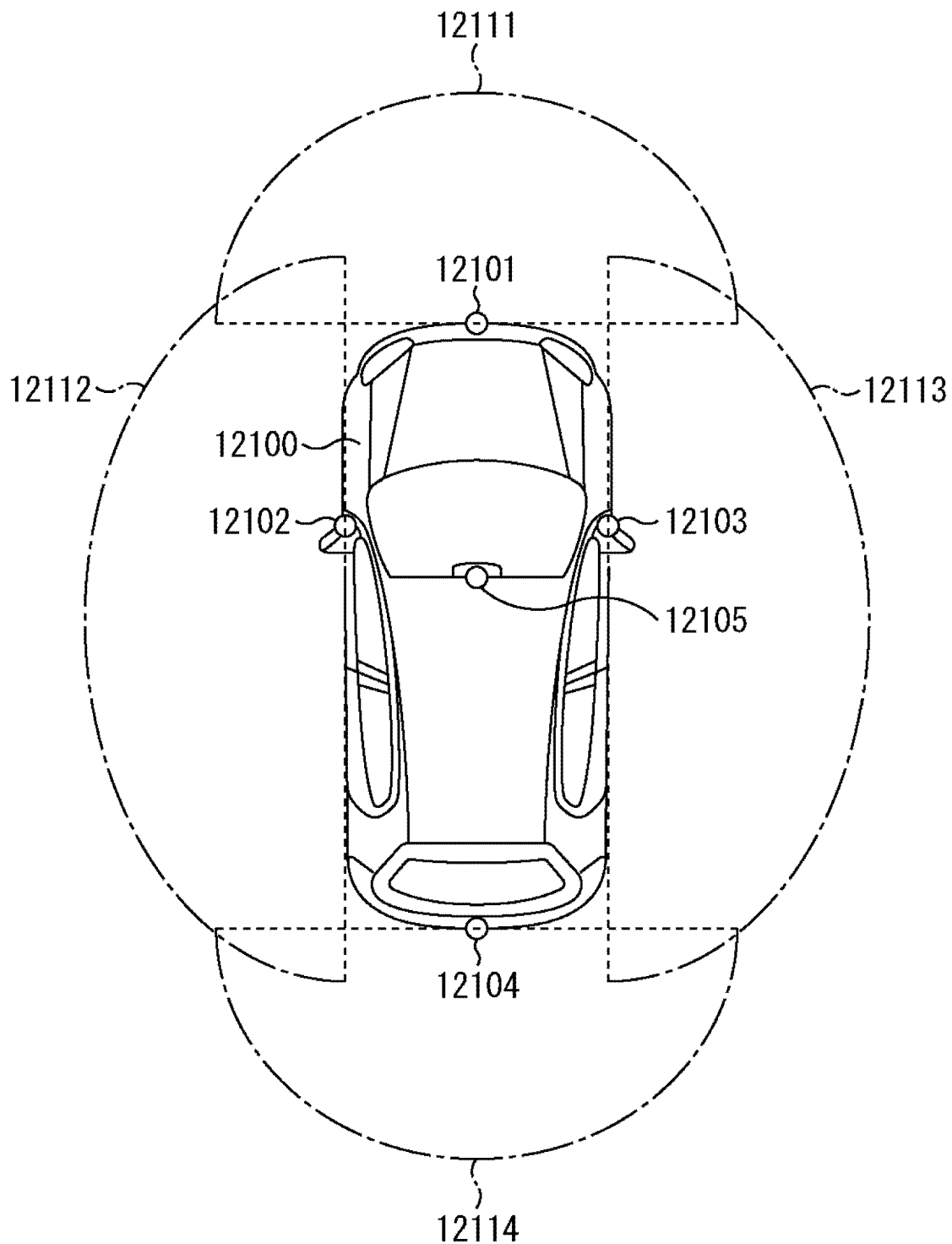
FIG. 19 is an explanatory view illustrating an example of installation locations of outside-vehicle information detection unit and imaging units.

FIG. 19 is a diagram illustrating examples of installation locations of the imaging unit 12031.

In FIG. 19, a vehicle 12100 includes imaging units 12101, 12102, 12103, 12104, 12105 as the imaging unit 12031.

For example, the imaging units 12101, 12102, 12103, 12104, 12105 are provided at locations such as a front nose, side mirrors, a rear bumper, a back door, and an upper portion of a windshield of a vehicle cabin of the vehicle 12100. The imaging unit 12101 provided on the front nose and the imaging unit 12105 provided on the upper portion of the windshield inside the vehicle cabin mainly acquire images in front of the vehicle 12100. The imaging units 12102, 12103 provided on the side mirrors mainly acquire images on lateral sides of the vehicle 12100. The imaging unit 12104 provided on the rear bumper or the back door mainly acquires an image behind the vehicle 12100. The front images acquired by the imaging units 12101, 12105 are mainly used to detect a preceding vehicle, a pedestrian, an obstacle, traffic lights, a traffic sign, a traffic lane, or the like.

Note that FIG. 19 illustrates examples of the image capturing ranges of the imaging units 12101 to 12104. An imaging range 12111 indicates the imaging range of the imaging unit 12101 provided on the front nose, imaging ranges 12112, 12113 indicate the imaging ranges of the imaging units 12102, 12103 provided on the side mirrors, respectively, and an imaging range 12114 indicates the imaging range of the imaging unit 12104 provided on the rear bumper or the back door. For example, by overlapping pieces of image data captured by the imaging units 12101 to 12104, a bird's eye view of the vehicle 12100 viewed from above can be obtained.

At least one of the imaging units 12101 to 12104 may have a function of acquiring distance information. For example, at least one of the imaging units 12101 to 12104 may be a stereo camera including a plurality of imaging elements, or an imaging element having pixels for phase difference detection.

For example, the microcomputer 12051 can extract, in particular, a closest three-dimensional object on a traveling road of the vehicle 12100, the three-dimensional object traveling at predetermined speed (for example, 0 km/h or more) in substantially the same direction as in the vehicle 12100 as a preceding car, by determining respective distances to the three-dimensional object in the imaging ranges 12111 to 12114, and the temporal changes of the distances (relative speed with respect to the vehicle 12100), on the basis of the distance information obtained from the imaging units 12101 to 12104. Moreover, the microcomputer 12051 can set an inter-vehicle distance to be secured behind the preceding car, and can perform automatic brake control (including follow-up stop control), automatic acceleration control (including follow-up start control), or the like. As described above, it is possible to perform coordinated control aiming at automatic driving or the like of travelling autonomously without depending on the driver's operation.

For example, on the basis of the distance information obtained from the imaging units 12101 to 12104, the microcomputer 12051 can classify three-dimensional object data relating to three-dimensional objects into two-wheeled vehicles, ordinary vehicles, large vehicles, pedestrians, utility poles, and other three-dimensional objects and extract them so as to be able to use them for automatic avoidance of obstacles. For example, the microcomputer 12051 identifies obstacles around the vehicle 12100 as obstacles visible to the driver of the vehicle 12100 and as obstacles hardly visible to the driver of the vehicle 12100. Then, the microcomputer 12051 judges the collision risk indicating the degree of risk of collision with each obstacle, and in a situation where there is a possibility of collision with the collision risk equal to or more than a setting value, the microcomputer 12051 can perform driving support for collision avoidance by outputting an alarm to the driver through the audio speaker 12061 or the display unit 12062 or performing forcible deceleration or avoidance steering through the drive-system control unit 12010.

At least one of the imaging units 12101 to 12104 may be an infrared camera that detects infrared light. For example, the microcomputer 12051 can recognize a pedestrian by judging whether or not a pedestrian is present in the images captured by the imaging units 12101 to 12104. Such pedestrian recognition is performed, for example, according to procedures for extracting characteristic points in images captured by the imaging units 12101 to 12104 as infrared cameras, and procedures for performing a pattern matching process on a series of characteristic points indicating the outline of an object to make a judgment as to whether or not the object is a pedestrian. If the microcomputer 12051 judges that a pedestrian is present in the captured images of the imaging units 12101 to 12104 and recognizes the pedestrian, the audio image output unit 12052 causes the display unit 12062 to display a square outline for emphasizing so as to be overlapped with the recognized pedestrian. Furthermore, the audio image output unit 12052 may cause the display unit 12062 to display an icon or the like indicating a pedestrian at a desired location.

An example of the vehicle control system to which the technology according to the present disclosure can be applied has been described above. The technology according to the present disclosure can be applied to the imaging unit 12031 in the configuration described above.

Note that the effects described in the present Description is an illustration only and not limited, and may have other effects.

The embodiments of the present technology are not limited to the above-described embodiments, and various modifications can be made without departing from the scope of the present technology.

The present technology can also be configured as follows.

(1)

A solid-state imaging device including:

a pixel array unit in which a plurality of pixels is arrayed;

a signal processing unit configured to perform a signal process including at least A/D conversion on a noise signal and a data signal read from the pixel; and a memory unit configured to retain a signal obtained in the signal process, in which the signal processing unit records the noise signal obtained from a predetermined frame in the memory unit, and performs the signal process of the data signal obtained from a frame after the predetermined frame by using the noise signal recorded in the memory unit.

(2)

The solid-state imaging device according to the (1), in which a plurality of photoelectric conversion units is formed in a region of each of the pixels of the pixel array unit.

(3)

The solid-state imaging device according to the (1) or the (2), in which switching between first driving for performing A/D conversion of each of the noise signal and the data signal and second driving for performing A/D conversion of the data signal is periodically performed.

(4)

The solid-state imaging device according to the (3), in which switching between the first driving and the second driving is periodically performed in units of frames.

(5)

The solid-state imaging device according to the (3) or the (4), in which the first driving is performed every time the second driving has been executed for a plurality of frames.

(6)

The solid-state imaging device according to the (3), in which switching between the first driving and the second driving is periodically performed in units of lines.

(7)

The solid-state imaging device according to the (6), in which the first driving is applied to one of lines at same locations in successive frames, and the second driving is applied to another of the lines.

(8)

The solid-state imaging device according to any one of the (1) to the (7) further including another signal processing unit configured to perform another signal process on the signal obtained in the signal process and retained in the memory unit.

(9)

The solid-state imaging device according to the (8), in which the another signal processing unit performs the another signal process including at least one of a defect correction process, a noise reduction process, or a high dynamic range (HDR) process on the signal obtained in the signal process and retained in the memory unit.

(10)

The solid-state imaging device according to the (8) or the (9), in which the another signal processing unit performs the another signal process at an identical processing rate during the first driving and the second driving.

(11)

The solid-state imaging device according to any one of the (1) to the (10), in which the memory unit has capacity capable of retaining a signal obtained as a result of the signal process, in units of frames.

(12)

The solid-state imaging device according to any one of the (1) to the (10) including a laminated chip structure.

(13)

A driving method of a solid-state imaging device including a pixel array unit in which a plurality of pixels is arrayed, a signal processing unit configured to perform a signal process including at least A/D conversion on a noise signal and a data signal read from the pixel, and a memory unit configured to retain a signal obtained in the signal process, the method including a recording step of recording, by the signal processing unit, the noise signal obtained from a predetermined frame in the memory unit, and a signal processing step of performing, by the signal processing unit, the signal process of the data signal obtained from a frame after the predetermined frame by using the noise signal recorded in the memory unit.

(14)

An electronic apparatus including a solid-state imaging device, in which the solid-state imaging device includes a pixel array unit in which a plurality of pixels is arrayed, a signal processing unit configured to perform a signal process including at least A/D conversion on a noise signal and a data signal read from the pixels, and a memory unit configured to retain a signal obtained in the signal process, and the signal processing unit records the noise signal obtained from a predetermined frame in the memory unit, and performs the signal process of the data signal obtained from a frame after the predetermined frame by using the noise signal recorded in the memory unit.

(15)

A solid-state imaging device including:

a first semiconductor substrate on which a plurality of pixels including a first pixel is arrayed;

a second semiconductor substrate including an A/D conversion unit configured to perform A/D conversion on a read signal read from the first pixel, and a third semiconductor substrate including a memory unit, in which the first semiconductor substrate, the second semiconductor substrate, and the third semiconductor substrate are laminated in three layers such that the first semiconductor substrate is the uppermost layer, the read signal includes a first noise signal and a first data signal obtained in a first frame, and a second data signal obtained in a second frame, the memory unit records the first noise signal, and the A/D conversion unit performs first A/D conversion according to the first data signal and the first noise signal and performs second A/D conversion according to the second data signal and the first noise signal.

(16)

A driving method of a solid-state imaging device including a first semiconductor substrate on which a plurality of pixels including a first pixel is arrayed, a second semiconductor substrate including an A/D conversion unit configured to perform A/D conversion on a read signal read from the first pixel, and
a third semiconductor substrate including a memory unit,
in which the first semiconductor substrate, the second semiconductor substrate, and the third semiconductor substrate are laminated in three layers such that the first semiconductor substrate is the uppermost layer, and
the read signal includes a first noise signal and a first data signal obtained in a first frame, and a second data signal obtained in a second frame,
the method including:
a recording step of recording, by the memory unit, the first noise signal;
a first A/D conversion step of performing, by the A/D conversion unit, first A/D conversion according to the first data signal and the first noise signal; and
a second A/D conversion step of performing, by the A/D conversion unit, second A/D conversion according to the second data signal and the first noise signal.

(17)
An electronic apparatus including a solid-state imaging device,
in which the solid-state imaging device includes
a first semiconductor substrate in which a plurality of pixels including a first pixel is arrayed,
a second semiconductor substrate including an A/D conversion unit configured to perform A/D conversion on a read signal read from the first pixel, and
a third semiconductor substrate including a memory unit,
the first semiconductor substrate, the second semiconductor substrate, and the third semiconductor substrate are laminated in three layers such that the first semiconductor substrate is the uppermost layer,
the read signal includes a first noise signal and a first data signal obtained in a first frame, and a second data signal obtained in a second frame,
the memory unit records the first noise signal, and
the A/D conversion unit performs first A/D conversion according to the first data signal and the first noise signal and performs second A/D conversion according to the second data signal and the first noise signal.

REFERENCE SIGNS LIST

10 Pixel array unit
11 Photoelectric conversion unit
21 Pixel array unit
22 Control unit
23 Preceding processing unit
24 Memory unit
25 Subsequent processing unit
31 First chip
32 Second chip
41 Via
61 First chip
62 Second chip
63 Third chip
81 Via
82 VIA

The invention claimed is:
1. A solid-state imaging device, comprising:
a memory unit;
a pixel array unit including an array of a plurality of pixels; and
a first signal processing unit configured to:
read a noise signal and a first data signal from a pixel of the plurality of pixels;
perform a first signal process, wherein the first signal process includes a first analog to digital (A/D) conversion of the noise signal and the first data signal;
record a signal in the memory unit, wherein
the recorded signal corresponds to a result of the first A/D conversion of the noise signal and the first data signal, and
the recorded signal includes the result of the first A/D conversion of the noise signal obtained from a first frame;
read a second data signal from the pixel of the plurality of pixels; and
perform a second signal process based on the result of the first A/D conversion of the noise signal, wherein the second signal process includes a second A/D conversion of the second data signal obtained from a second frame that is subsequent to the first frame.

2. The solid-state imaging device according to claim 1, further comprising a plurality of photoelectric conversion units in a region of each of the plurality of pixels of the pixel array unit.

3. The solid-state imaging device according to claim 1, wherein the first signal processing unit is further configured to periodically switch a driving process between a first driving process to perform the first A/D conversion of each of the noise signal and the first data signal and a second driving process to perform the second A/D conversion of the second data signal.

4. The solid-state imaging device according to claim 3, wherein the first signal processing unit is further configured to periodically switch the driving process in units of frames.

5. The solid-state imaging device according to claim 4, wherein the first signal processing unit is further configured to perform the first driving process every time the second driving process is performed for a plurality of frames.

6. The solid-state imaging device according to claim 3, wherein the first signal processing unit is further configured to periodically switch the driving process in units of lines.

7. The solid-state imaging device according to claim 6, wherein
the first driving process is associated with a first line of the units of lines at same location in successive frames of a plurality of frames, and
the second driving process is associated with a second line of the units of lines in the successive frames of the plurality of frames.

8. The solid-state imaging device according to claim 3, further comprising a second signal processing unit configured to perform a third signal process on the recorded signal.

9. The solid-state imaging device according to claim 8, wherein the third signal process includes at least one of a defect correction process, a noise reduction process, or a high dynamic range (HDR) process.

10. The solid-state imaging device according to claim 9, wherein a processing rate of each of the first signal process, the second signal process, and the third signal process is identical.

11. The solid-state imaging device according to claim 2, wherein the memory unit is configured to record the signal in units of frames.

12. The solid-state imaging device according to claim 1, wherein the solid-state image device has a laminated chip structure.

13. A driving method, comprising:
in a solid-state imaging device: that includes a signal processing unit, a memory unit, and a pixel array unit having an array of a plurality of pixels:
   reading a noise signal and a first data signal from a pixel of the plurality of pixels;
   performing, by the signal processing unit, a first signal process, wherein the first signal process includes a first analog to digital (A/D) conversion of the noise signal and the first data signal;
   recording, by the signal processing unit, a signal in the memory unit, wherein
      the recorded signal corresponds to a result of the first A/D conversion of the noise signal and the first data signal, and
      the recorded signal includes the result of the first A/D conversion of the noise signal obtained from a first frame; and
   reading a second data signal from the pixel of the plurality of pixels; and
   performing, by the signal processing unit, a second signal process based on the result of the first A/D conversion of the noise signal, wherein the second signal process includes to including a second A/D conversion of the second data signal obtained from a second frame that is subsequent to the first frame.

14. An electronic apparatus, comprising:
a solid-state imaging device including:
   a memory unit;
   a pixel array unit including an array of a plurality of pixels; and
   a signal processing unit configured to:
      read a noise signal and a first data signal from a pixel of the plurality of pixels;
      perform a first signal process, wherein the first signal process includes a first analog to digital (A/D) conversion of the noise signal and the first data signal;
      record a signal in the memory unit, wherein
         the recorded signal corresponds to a result of the first A/D conversion of the noise signal and the first data signal, and
         wherein the recorded signal includes the result of the first A/D conversion of the noise signal obtained from a first frame;
      read a second data signal from the pixel of the plurality of pixels; and
      perform a second signal process based on the result of the first A/D conversion of the noise signal, wherein the second signal process includes a second A/D conversion of the second data signal obtained from a second frame that is subsequent to the first frame.

15. A solid-state imaging device, comprising:
a first semiconductor substrate including an array of a plurality of pixels;
a second semiconductor substrate including an analog to digital (A/D) conversion unit configured to:
   read a signal from a pixel of the plurality of pixels; and
   perform a first A/D conversion and a second A/D conversion of the read signal; and
a third semiconductor substrate including a memory unit, wherein
   the first semiconductor substrate, the second semiconductor substrate,
   and the third semiconductor substrate are laminated in three layers,
   the first semiconductor substrate is in an uppermost layer of the three layers,
   the read signal includes:
      a noise signal and a first data signal obtained from a first frame,
      and
      a second data signal obtained from a second frame that is subsequent to the first frame,
   the A/D conversion unit is further configured to perform the first A/D conversion of the first data signal and the noise signal,
   the memory unit is configured to record a result of the first A/D conversion of the noise signal,
   the result of the first A/D conversion of the noise signal is obtained from the first frame, and
   perform the second A/D conversion based on the second data signal and the result of the first A/D conversion of the noise signal.

16. A driving method, comprising:
in a solid-state imaging device that includes:
   a first semiconductor substrate including an array of a plurality of pixels;
   a second semiconductor substrate including an analog to digital (A/D) conversion unit configured to:
      read a signal from a pixel of the plurality of pixels; and
      perform a first A/D conversion and a second A/D conversion of the read signal; and
   a third semiconductor substrate including a memory unit, wherein
      the first semiconductor substrate, the second semiconductor substrate,
   and the third semiconductor substrate are laminated in three layers,
      the first semiconductor substrate is in an uppermost layer of the three layers, and
      the read signal includes:
         a noise signal and a first data signal obtained from a first frame; and
         a second data signal obtained from a second frame that is subsequent to the first frame,
   the driving method comprising:
      performing, by the A/D conversion unit, the first A/D conversion of the first data signal and the noise signal;
      recording, in the memory unit, a result of the first A/D conversion of the noise signal, wherein the result of the first A/D conversion of the noise signal is obtained from the first frame; and
      performing, by the A/D conversion unit, the second A/D conversion based on the second data signal and the result of the first A/D conversion of the noise signal.

17. An electronic apparatus, comprising:
a solid-state imaging device including:
   a first semiconductor substrate including an array of a plurality of pixels;
   a second semiconductor substrate including an analog to digital (A/D) conversion unit configured to:
      read a signal from a pixel of the plurality of pixels; and
      perform a first A/D conversion and a second A/D conversion of the read signal; and
   a third semiconductor substrate including a memory unit, wherein
      the first semiconductor substrate, the second semiconductor substrate, and the third semiconductor substrate are laminated in three layers, the first semiconductor substrate is in an uppermost layer of the three layers, the read signal includes:
- a noise signal and a first data signal obtained from a first frame, and
- a second data signal a second frame that is subsequent to the first frame, the A/D conversion unit is further configured to perform the first A/D conversion of based first data signal and the noise signal, the memory unit is configured to record a result of the first A/D conversion of the noise signal, the result of the first A/D conversion of the noise signal is obtained from the first frame, and perform the second A/D conversion based on the second data signal and the result of the first A/D conversion of the noise signal.

18. A solid-state imaging device, comprising:

a memory unit;

a pixel array unit including an array of a plurality of pixels; and a first signal processing unit configured to:

perform a first signal process including a first analog to digital (A/D) conversion of a noise signal and a first data signal read from a pixel of the plurality of pixels;

record a signal obtained as a result of the first A/D conversion in the memory unit, wherein the recorded signal includes the noise signal obtained from a first frame;

perform a second signal process including a second A/D conversion of a second data signal obtained from a second frame subsequent to the first frame, wherein the second A/D conversion is based on the noise signal of the first frame recorded in the memory unit; and periodically switch between a first driving process to perform the first A/D conversion of each of the noise signal and the first data signal and a second driving process to perform the second A/D conversion of the second data signal, wherein the switch between the first driving process and the second driving process is periodically performed in units of lines, the first driving process is applied to a first line of the units of lines at same location in successive frames of a plurality of frames, and the second driving process is applied to a second line of the units of lines in the successive frames of the plurality of frames.

* * * * *